(12) United States Patent
Ito

(10) Patent No.: US 7,639,294 B2
(45) Date of Patent: Dec. 29, 2009

(54) IMAGE PICKUP APPARATUS WITH LIGHT CONTROLLING DEVICE

(75) Inventor: Motoshige Ito, Kanagawa (JP)

(73) Assignee: Sony Corporation, Tokyo (JP)

( * ) Notice: Subject to any disclaimer, the term of this patent is extended or adjusted under 35 U.S.C. 154(b) by 611 days.

(21) Appl. No.: 11/004,884

(22) Filed: Dec. 7, 2004

(65) Prior Publication Data
US 2005/0134721 A1 Jun. 23, 2005

(30) Foreign Application Priority Data
Dec. 18, 2003 (JP) .......................... P2003-421137

(51) Int. Cl.
H04N 3/14 (2006.01)
H04N 5/235 (2006.01)
H04N 5/225 (2006.01)

(52) U.S. Cl. .................. 348/296; 348/221.1; 348/362; 348/373; 348/374

(58) Field of Classification Search ................ 348/363, 348/370, 296, 220.1, 221.1, 222.1, 294, 362, 348/373, 374; 396/111, 119, 121
See application file for complete search history.

(56) References Cited

U.S. PATENT DOCUMENTS 5,760,834 A * 6/1998 Rostoker ................ 348/340

2002/0030737 A1 * 3/2002 Hashimoto et al. ........... 348/96
2002/0044213 A1 * 4/2002 Shinomiya et al. .......... 348/340
2004/0095501 A1 * 5/2004 Aizawa et al. .............. 348/340
2004/0212724 A1 * 10/2004 Bawolek et al. ............. 348/363

FOREIGN PATENT DOCUMENTS

JP 06-165003 6/1994
JP 10-073864 3/1998

OTHER PUBLICATIONS

Japanese Office Action, Mailing Date Jun. 13, 2006.

* cited by examiner

Primary Examiner—Nhan T Tran
Assistant Examiner—Peter Chon
(74) Attorney, Agent, or Firm—Rader, Fishman & Grauer PLLC

(57) ABSTRACT

Disclosed is an image pickup apparatus having a liquid crystal light controlling device in front of an image pickup device. A liquid crystal light controlling device has a rear face facing an image pickup device and has input terminals disposed at the circumferential positions of the rear face. An image pickup device has a package and a sensor portion held in the package for picking up an image of a subject. At positions of the package facing the liquid crystal light controlling device, there are disposed output terminals for supplying driving voltage to each of the input terminals of the liquid crystal light controlling device. The driving voltage is supplied from the output terminals on the package to the input terminals through a conducting portion of a holding member.

9 Claims, 23 Drawing Sheets

F I G. 1
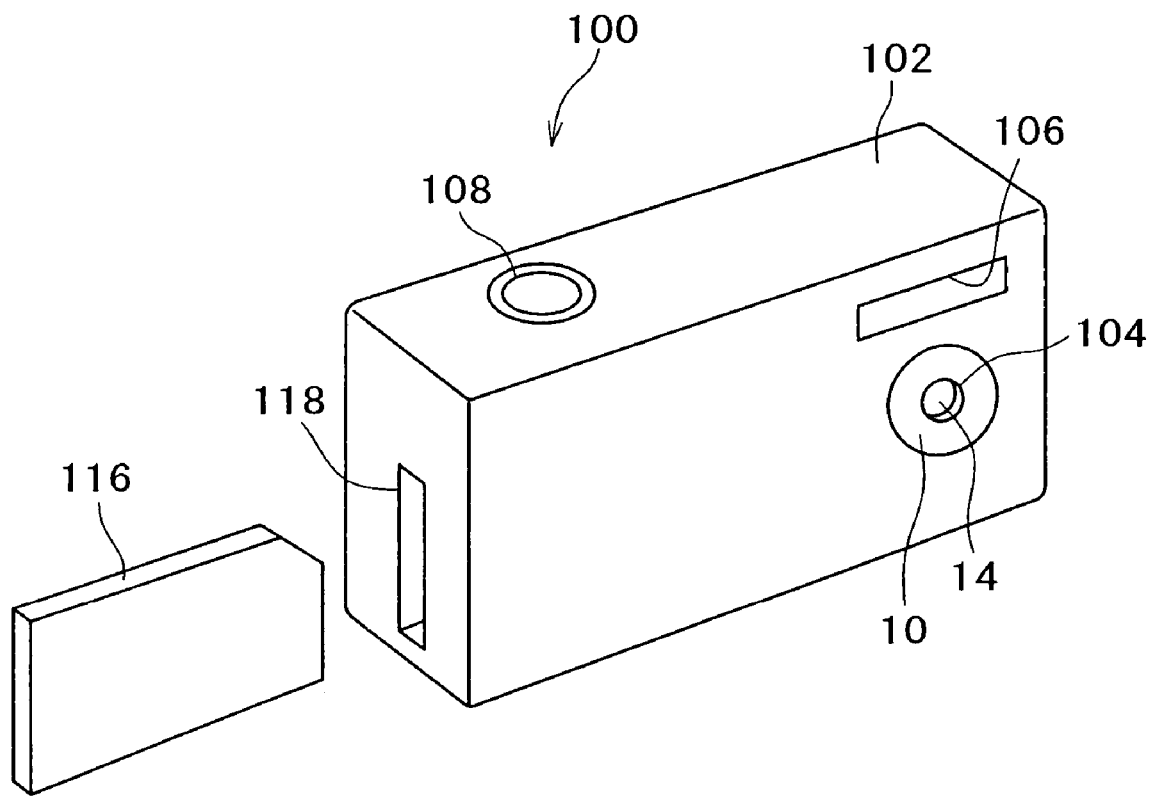

F I G. 1 1
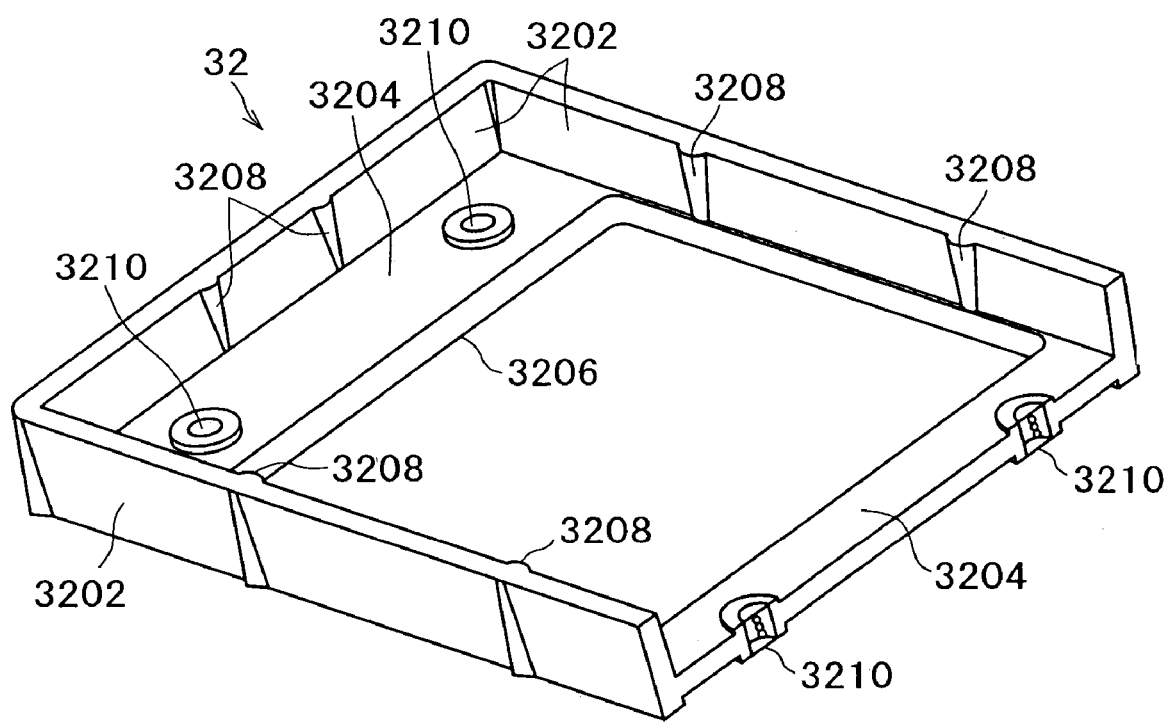

F I G. 2 1
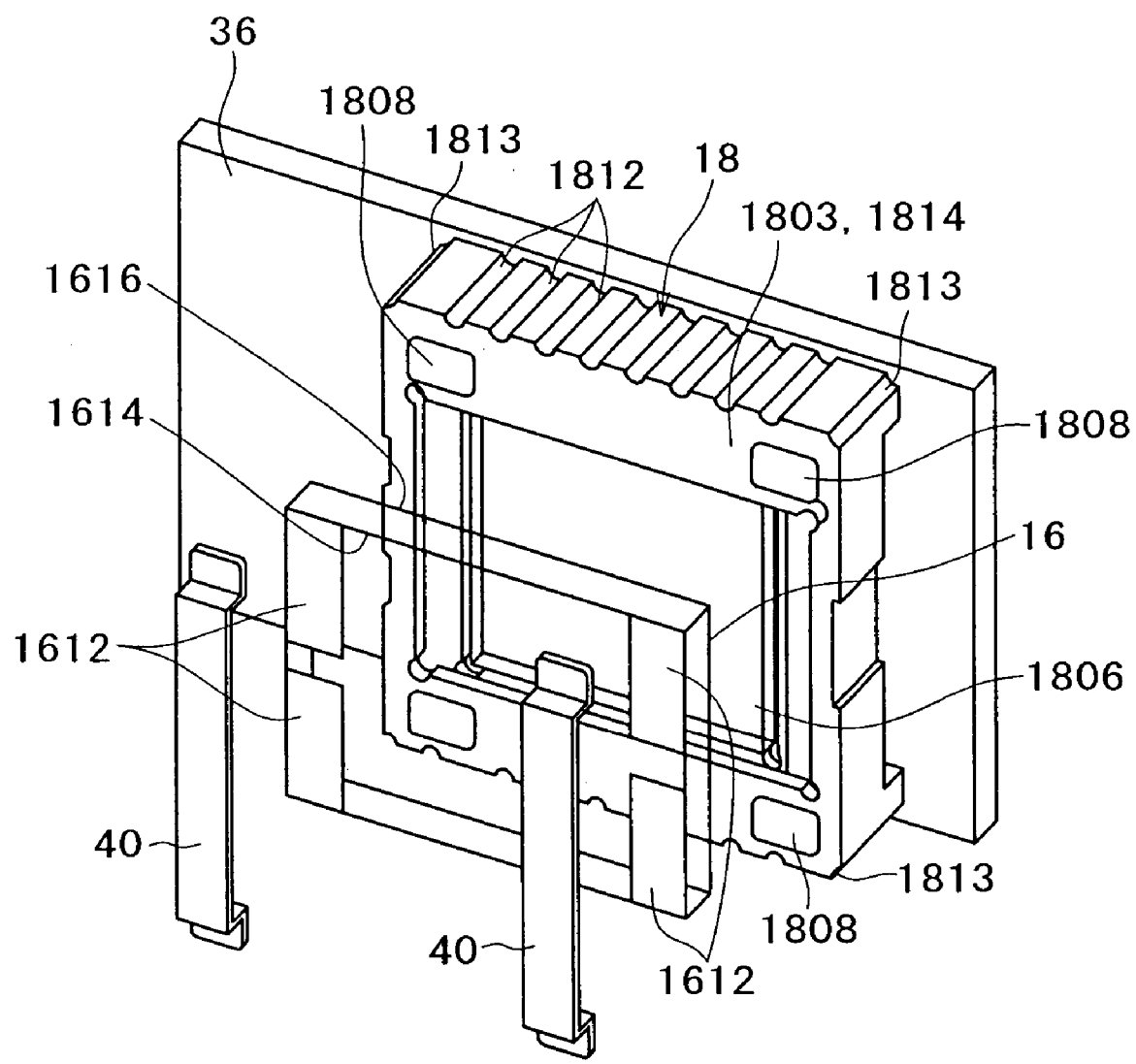

IMAGE PICKUP APPARATUS WITH LIGHT CONTROLLING DEVICE

BACKGROUND OF THE INVENTION

1. Field of the Invention

The present invention relates to an image pickup apparatus.

2. Description of Related Art

An image pickup apparatus such as a digital camera or a video camera has an image pickup device for picking up the image of a subject and a light control means for controlling the quantity of light led to the image pickup device. There is proposed an image pickup apparatus using as the light control means a light controlling device such as a liquid crystal light controlling device whose light transmittance is varied by the supply of a driving voltage to its input terminal. (Refer, for example, to Japanese Patent Unexamined Publication No. Hei 10-73864.)

In the cited image pickup apparatus, an image pickup device is mounted on a substrate and a light controlling device is mounted on the substrate via a holder so as to be positioned forwardly of the image pickup device. Further, by providing conductive rubber between the input terminal of the liquid crystal and the substrate at a side of the image pickup device, the driving voltage is adapted so as to be supplied to the input terminal from the substrate.

In such a conventional image pickup apparatus, some space around the image pickup device is occupied by the conductive rubber disposed at the side of the image pickup device and in addition some space around the image pickup device is occupied by the holder for holding the conductive rubber. Because of this, it has been difficult to make the apparatus compact. Further, there has been a problem of complexity in providing a mechanism for fixing the light controlling device and the conductive rubber to the holder.

SUMMARY OF THE INVENTION

The present invention has been made in view of the above-mentioned problems with conventional image pickup apparatuses. Accordingly, it is an object to provide an image pickup apparatus in a configuration having a light controlling device disposed forwardly of an image pickup device and having advantages in terms of compactness and simplicity.

In order to attain the object, according to one aspect of the present invention, the image pickup apparatus includes an image pickup device having a sensor portion for picking up an image of a subject and a package for holding the sensor portion and a light controlling device disposed in front of the image pickup device, transmittance thereof of light led to the image pickup device is adjusted by a driving voltage applied thereto, and in which the light controlling device is provided with an input terminal to receive the driving voltage and an output terminal for supplying the driving voltage to the input terminal is disposed at a position facing the light controlling device of the package of the image pickup device.

According to the present invention, the output terminal for supplying the input terminal with the driving voltage is provided at a position facing the light controlling device of the package of the image pickup device, and, hence, the need for disposing a component for connecting the input terminal with the output terminal at the circumference of the package of the image pickup device can be eliminated. Because of this, the space occupied by such a component can be saved, and this provides an advantageous effect in achieving a smaller sized apparatus. Since, further, the mechanism for connecting the input terminal with the output terminal can be simplified, an advantage in reducing the cost can be obtained.

Other and further objects, features and advantages of the invention will appear more fully from the following description.

BRIEF DESCRIPTION OF THE DRAWINGS

FIG. 1 is a perspective view seen from the front of an image pickup apparatus of a first embodiment;

FIG. 11 is a perspective view of a holding member;

FIG. 21 is an exploded view in perspective of a rear unit of a fourth embodiment;

DETAILED DESCRIPTION OF THE PREFERRED EMBODIMENTS

The object to provide a compact and simplified configuration has been attained by disposing the output terminal for supplying the driving voltage to the input terminal of the light controlling device at a position facing the light controlling device of the package of the image pickup device.

First Embodiment

A first embodiment of the present invention will be described below with reference to the accompanying drawings.

In the present embodiment, a case where a lens barrel of the present invention is incorporated in an image pickup apparatus will be described.

Figure 2:
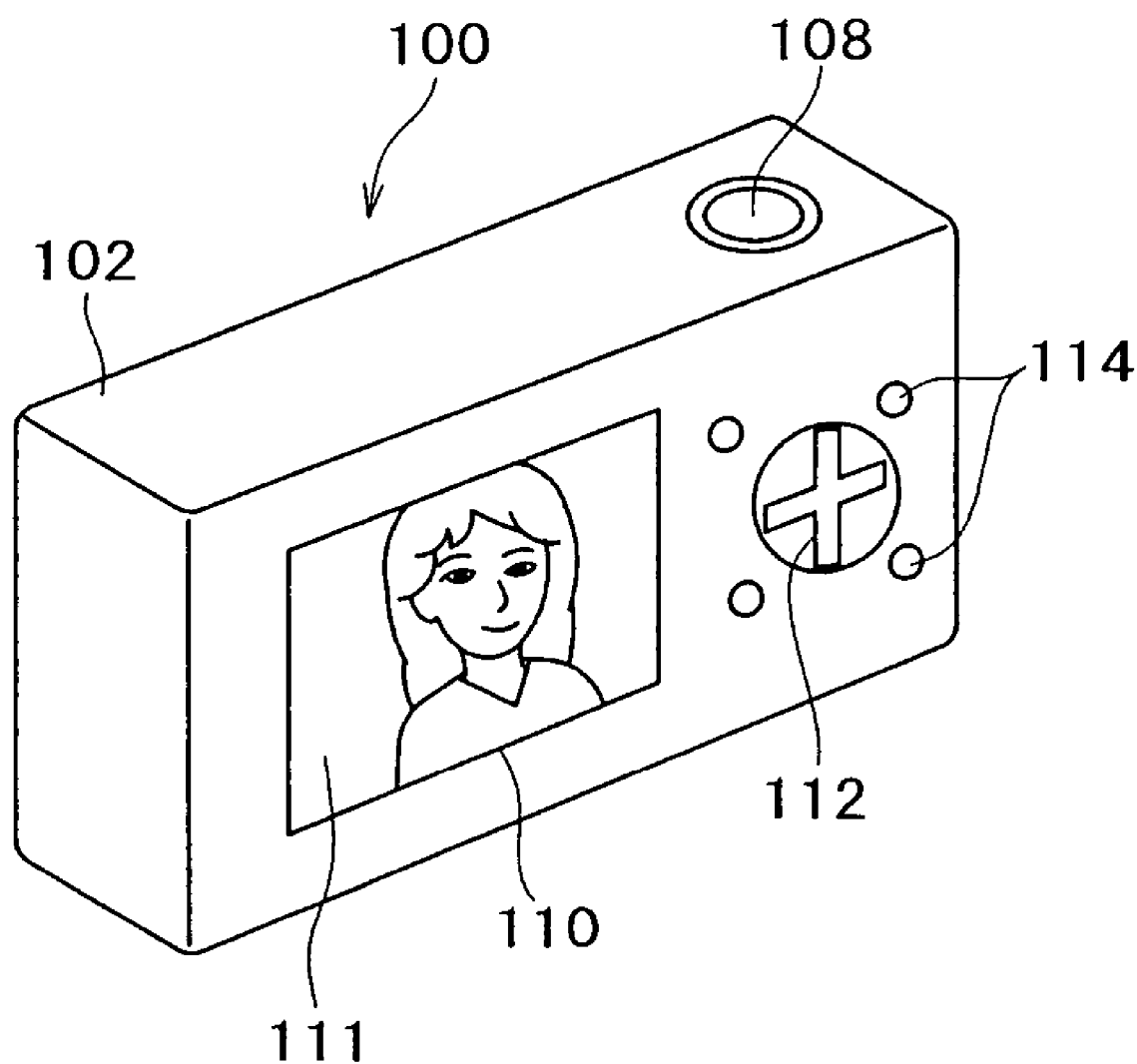
FIG. 2 is a perspective view seen from the rear of the image pickup apparatus of the first embodiment.
Figure 3:
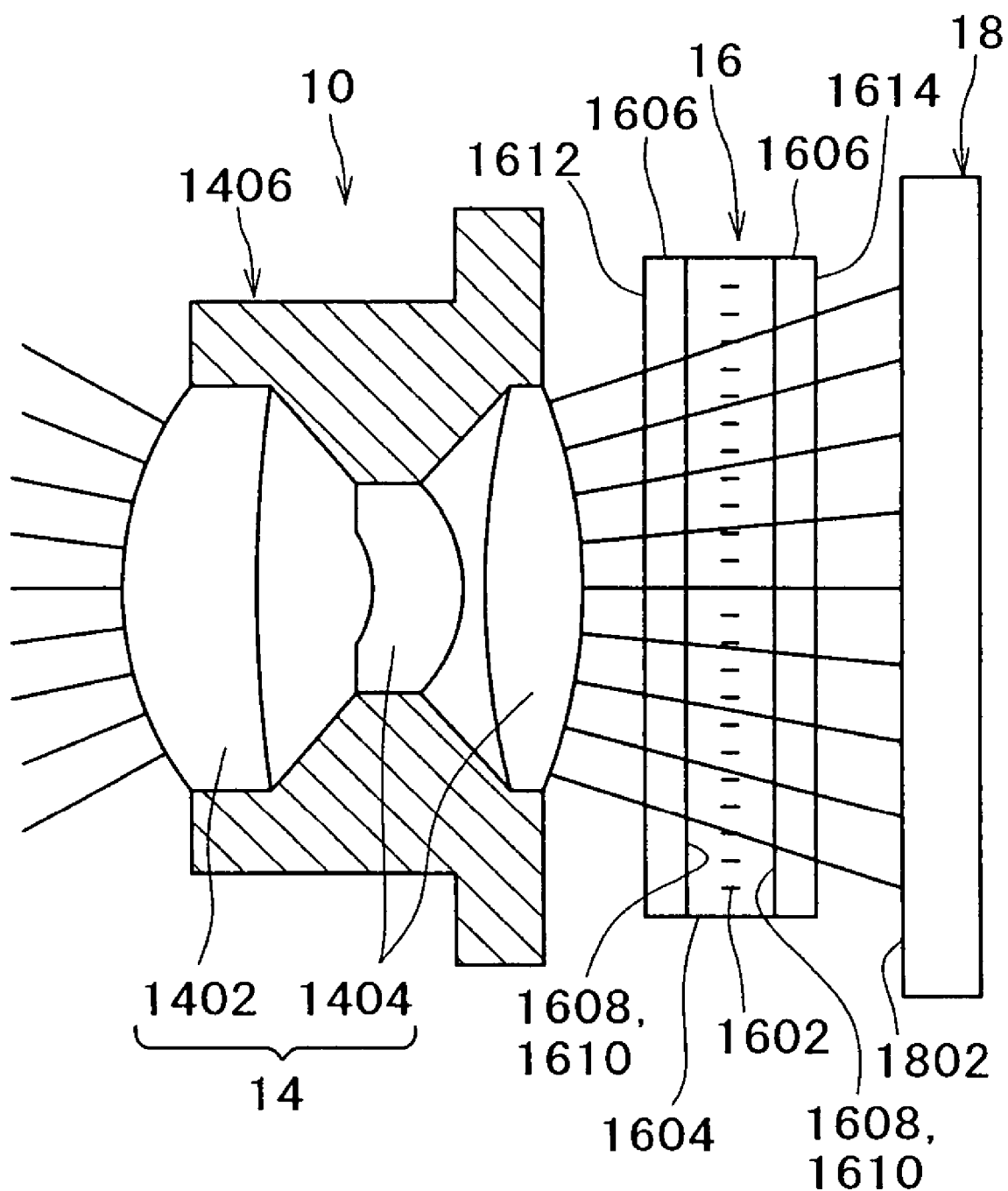
FIG. 3 is a schematic construction drawing of a lens barrel 10.
Figure 4:
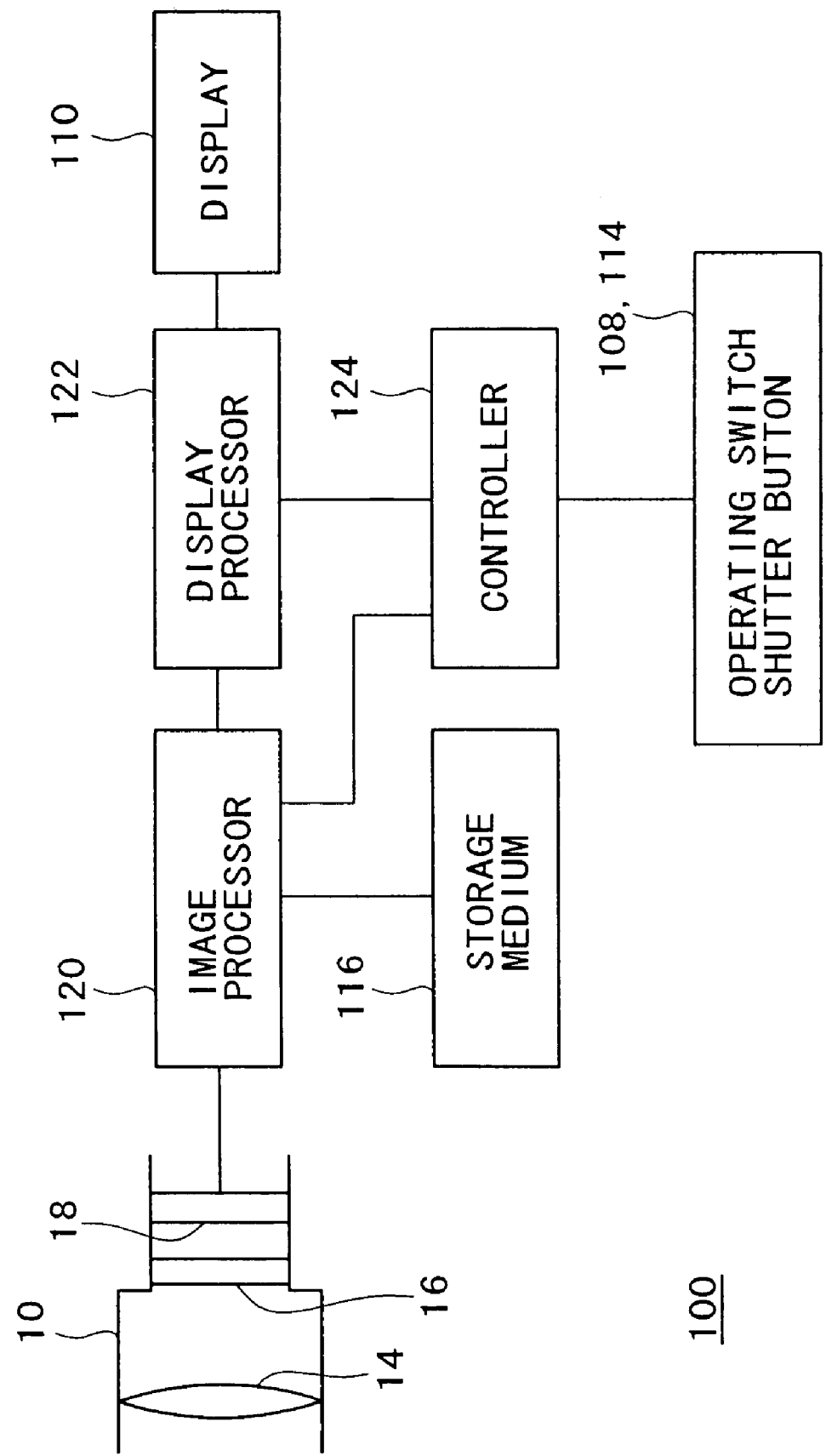
FIG. 4 is a block diagram showing a control system of the image pickup apparatus.
Figure 5:
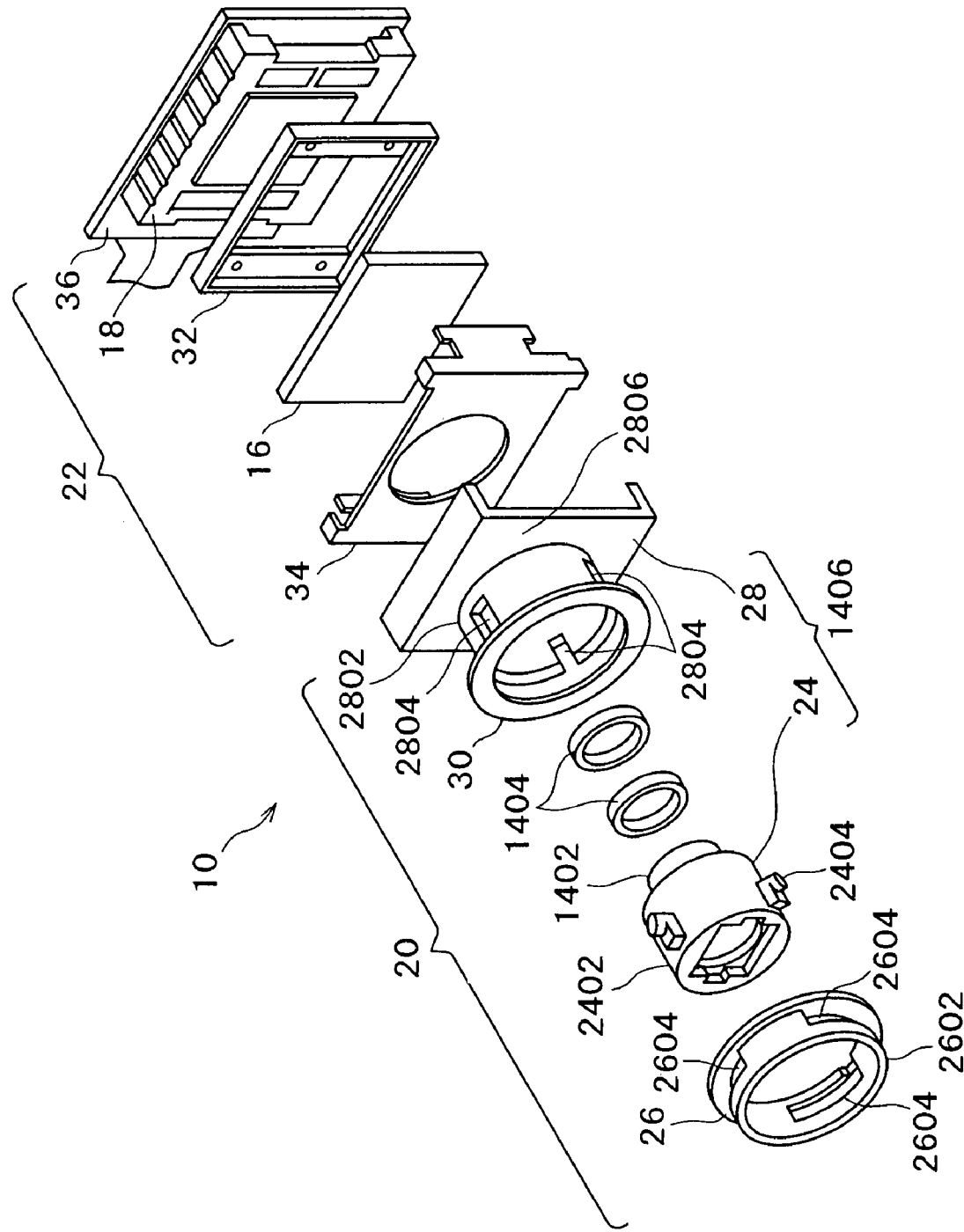
FIG. 5 is an exploded view in perspective of lens barrel 10.
Figure 6:
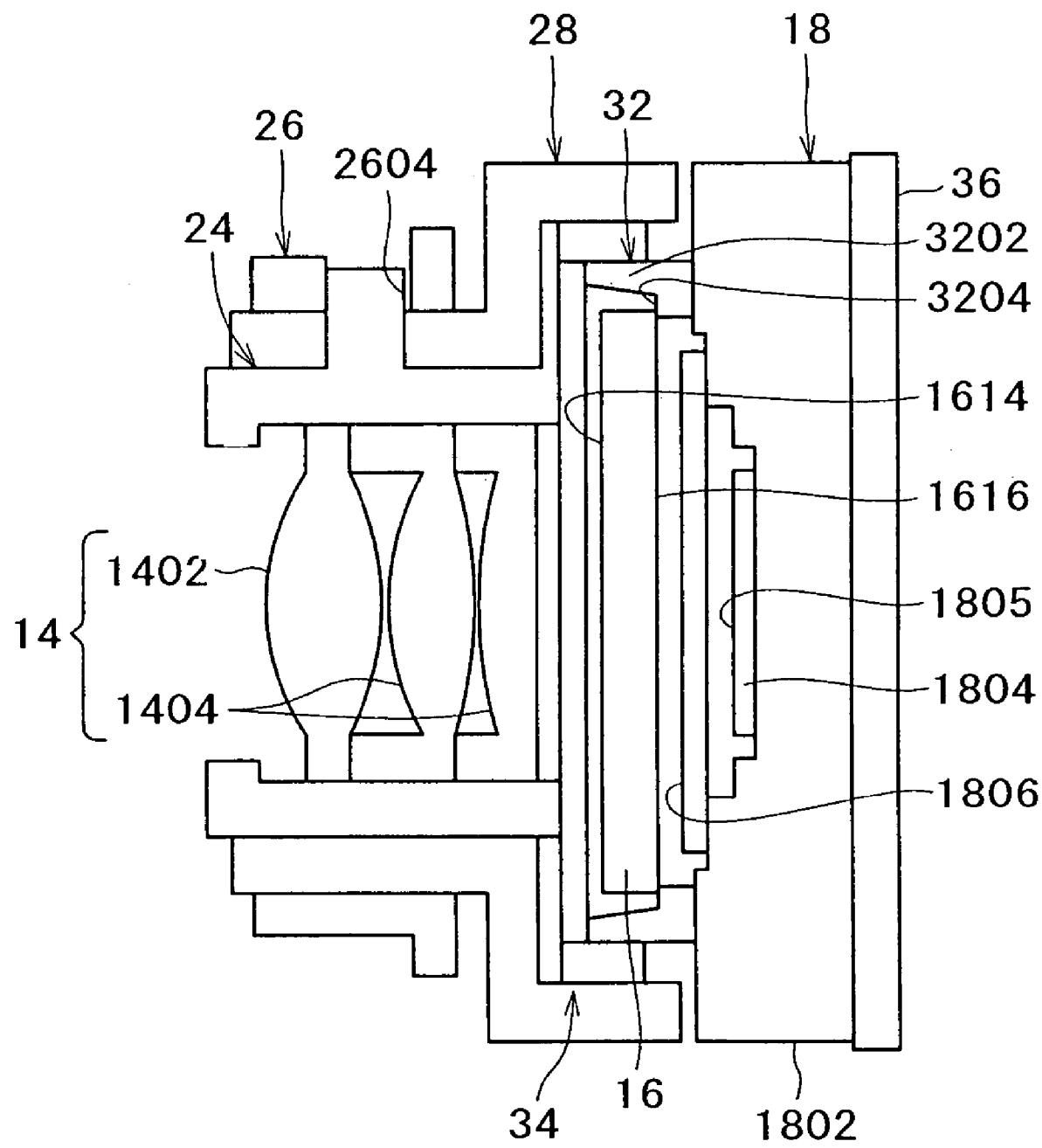
FIG. 6 is a sectional view of lens barrel 10.
Figure 7:
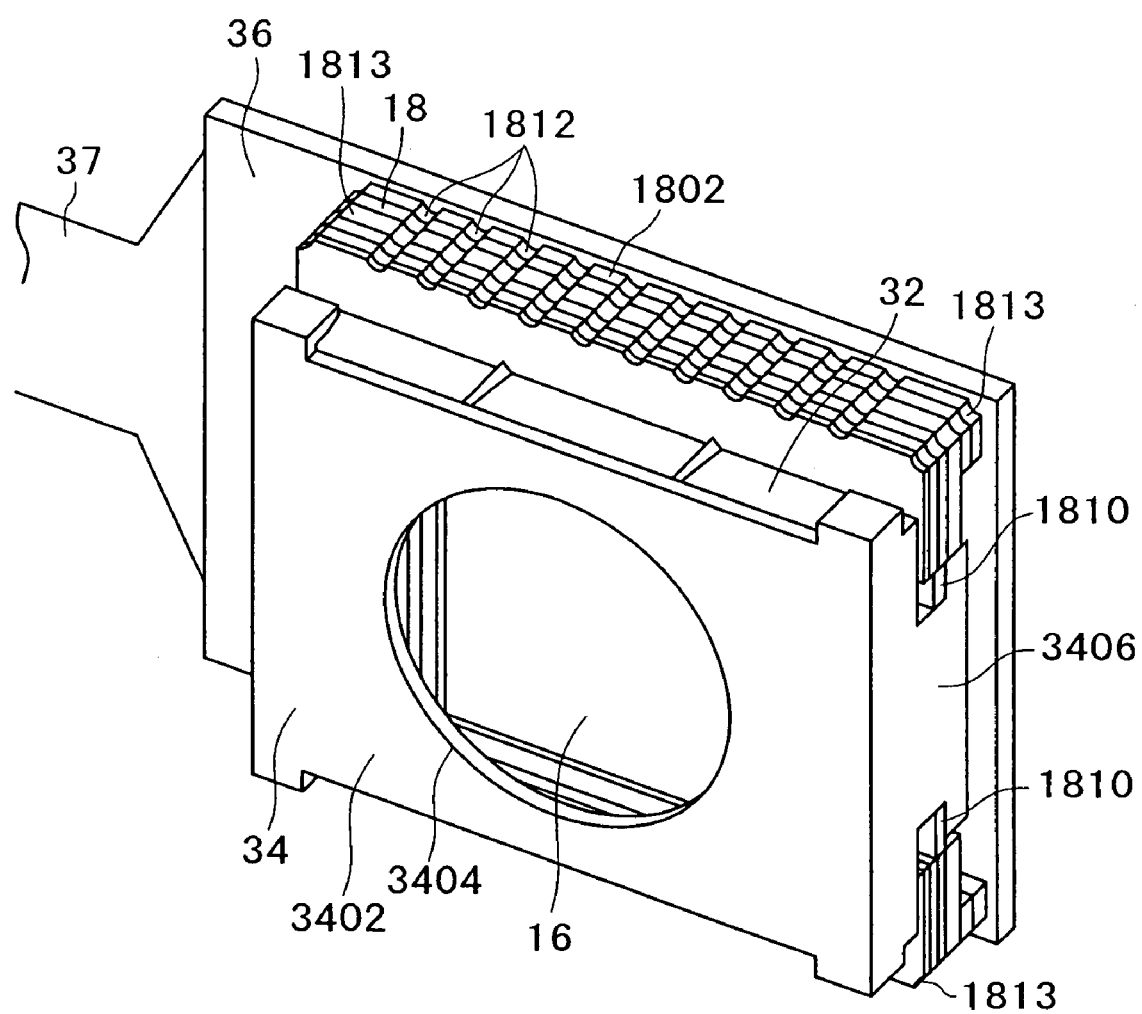
FIG. 7 is an assembly drawing of a rear unit including liquid crystal light controlling device 16 and image pickup device 18.
Figure 8:
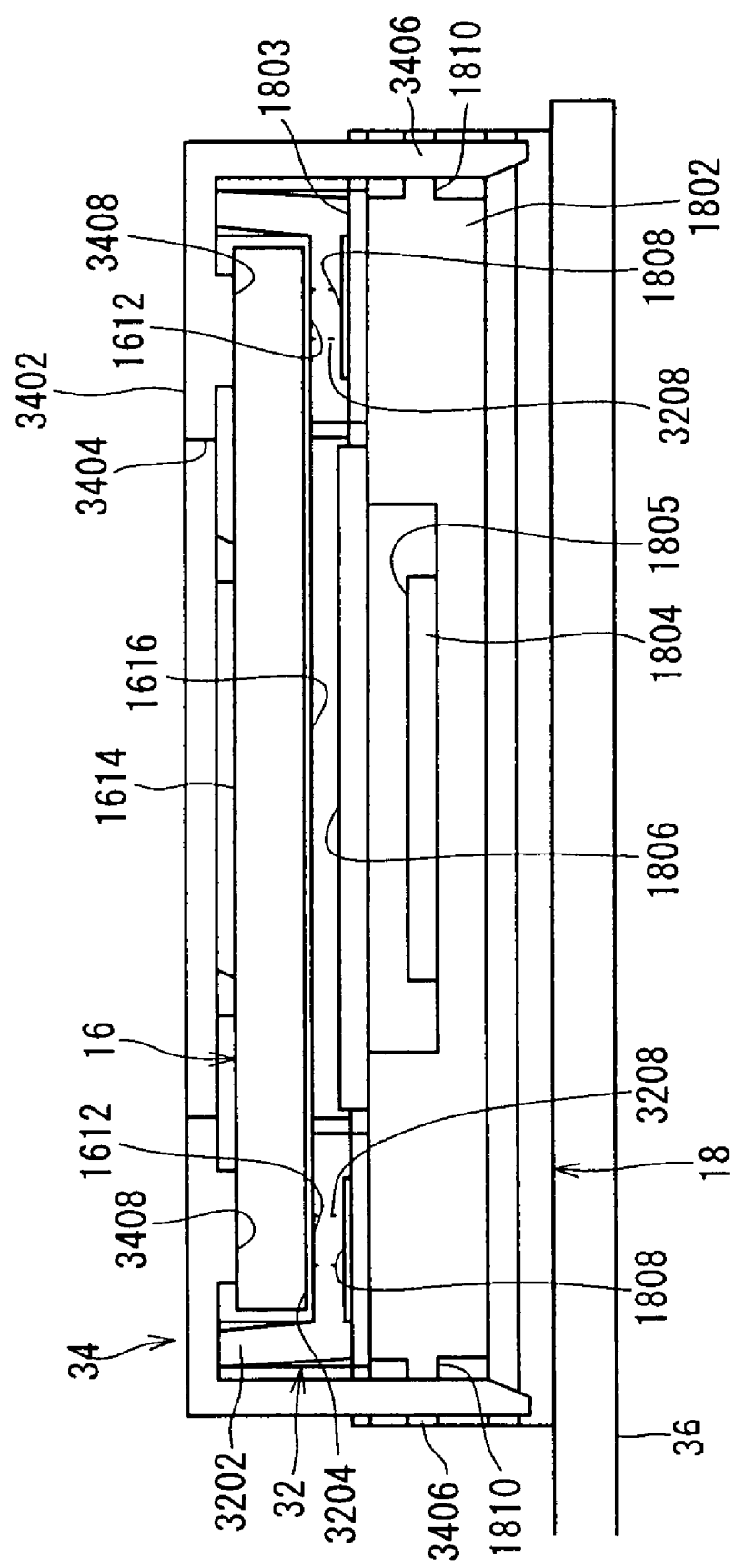
FIG. 8 is a sectional view of FIG. 7.
Figure 9:
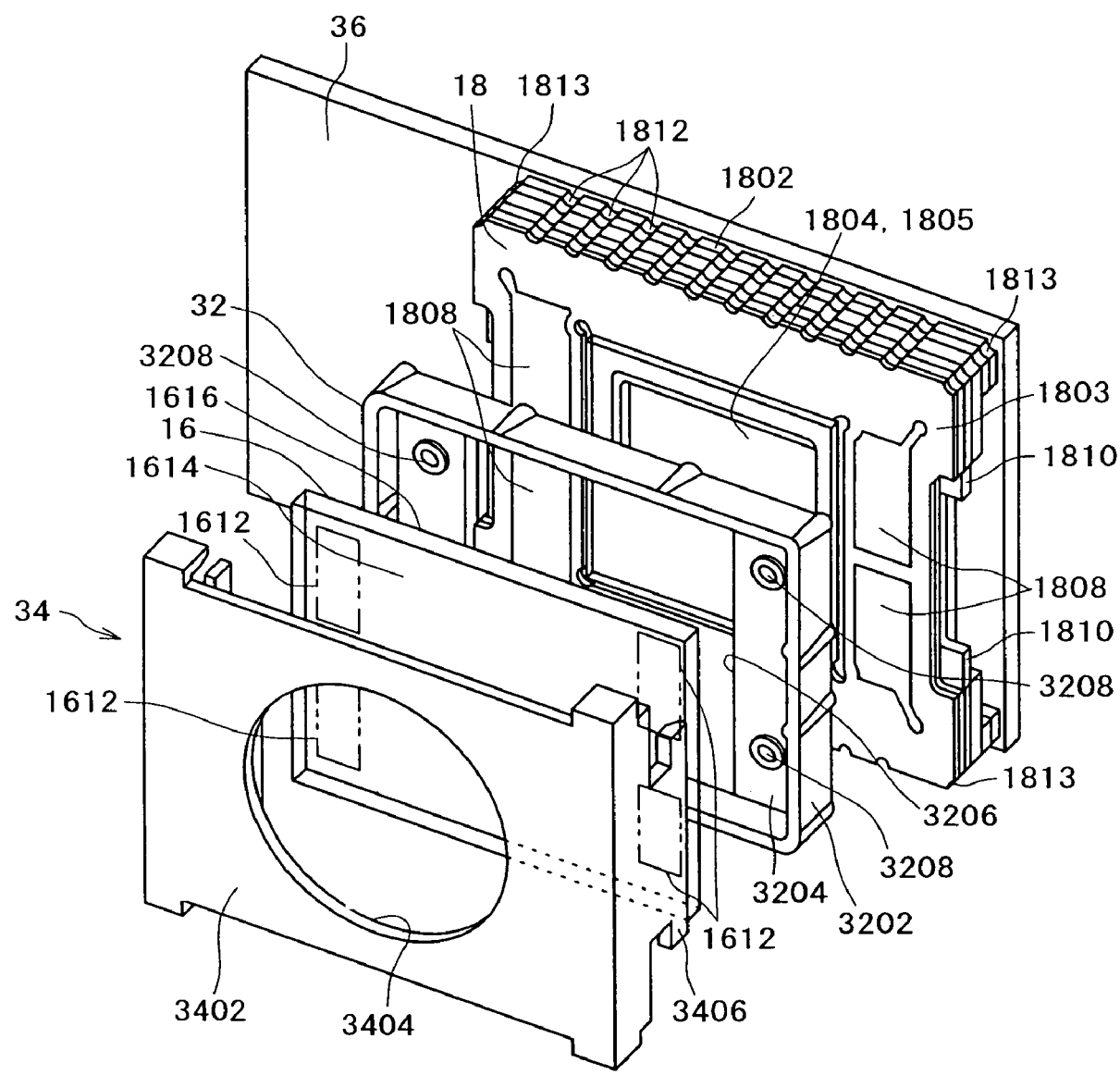
FIG. 9 is an exploded view in perspective of the rear unit.
Figure 10B:
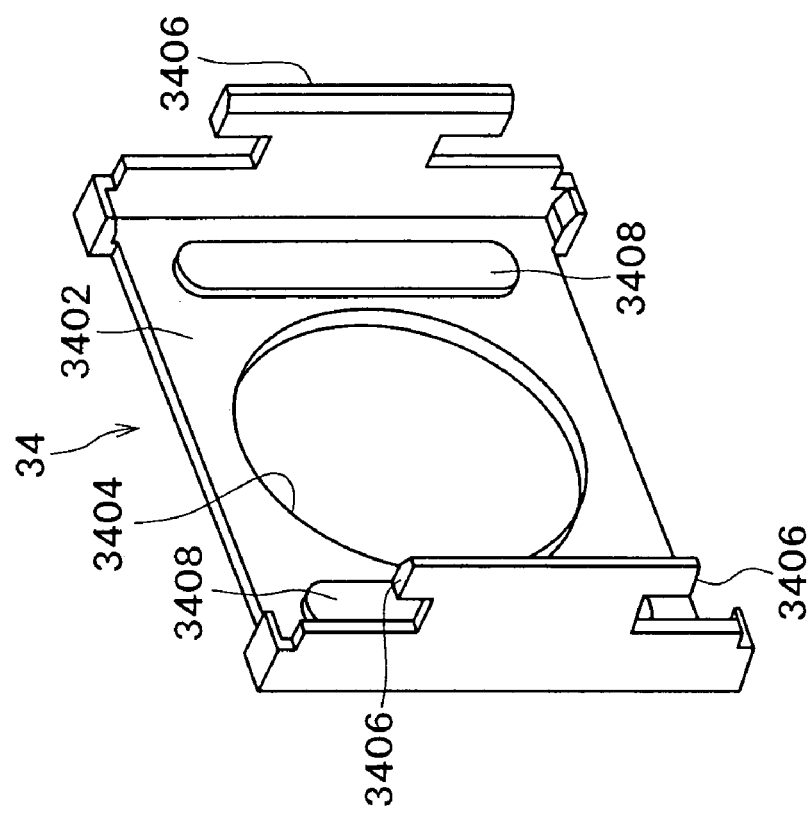
FIG. 10 is a perspective view of a presser member.
Figure 10A:
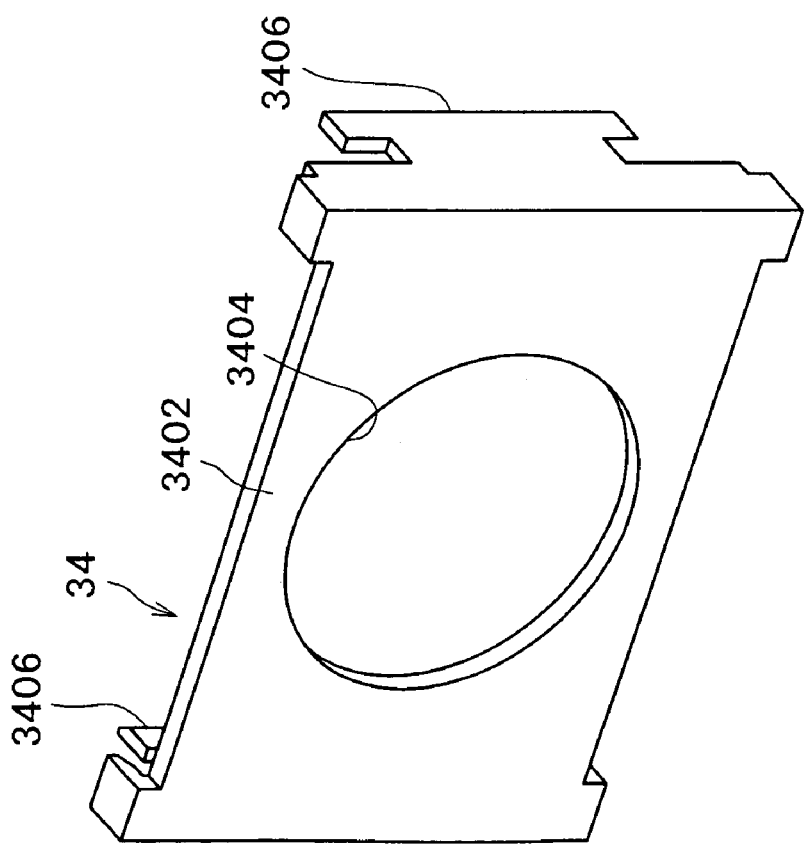
Figure 12:
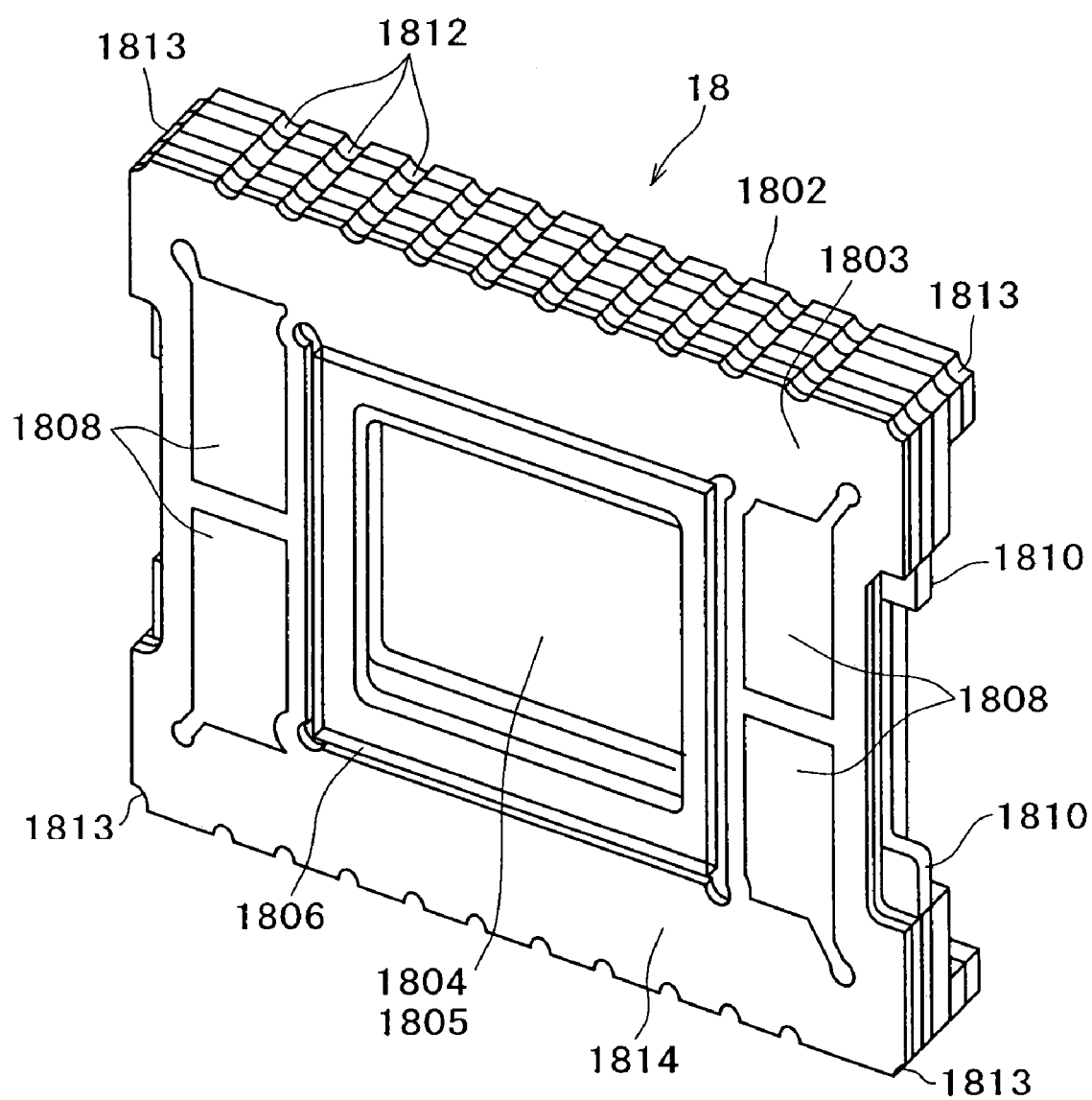
FIG. 12 is a perspective view of image pickup device 18.
Figure 13:
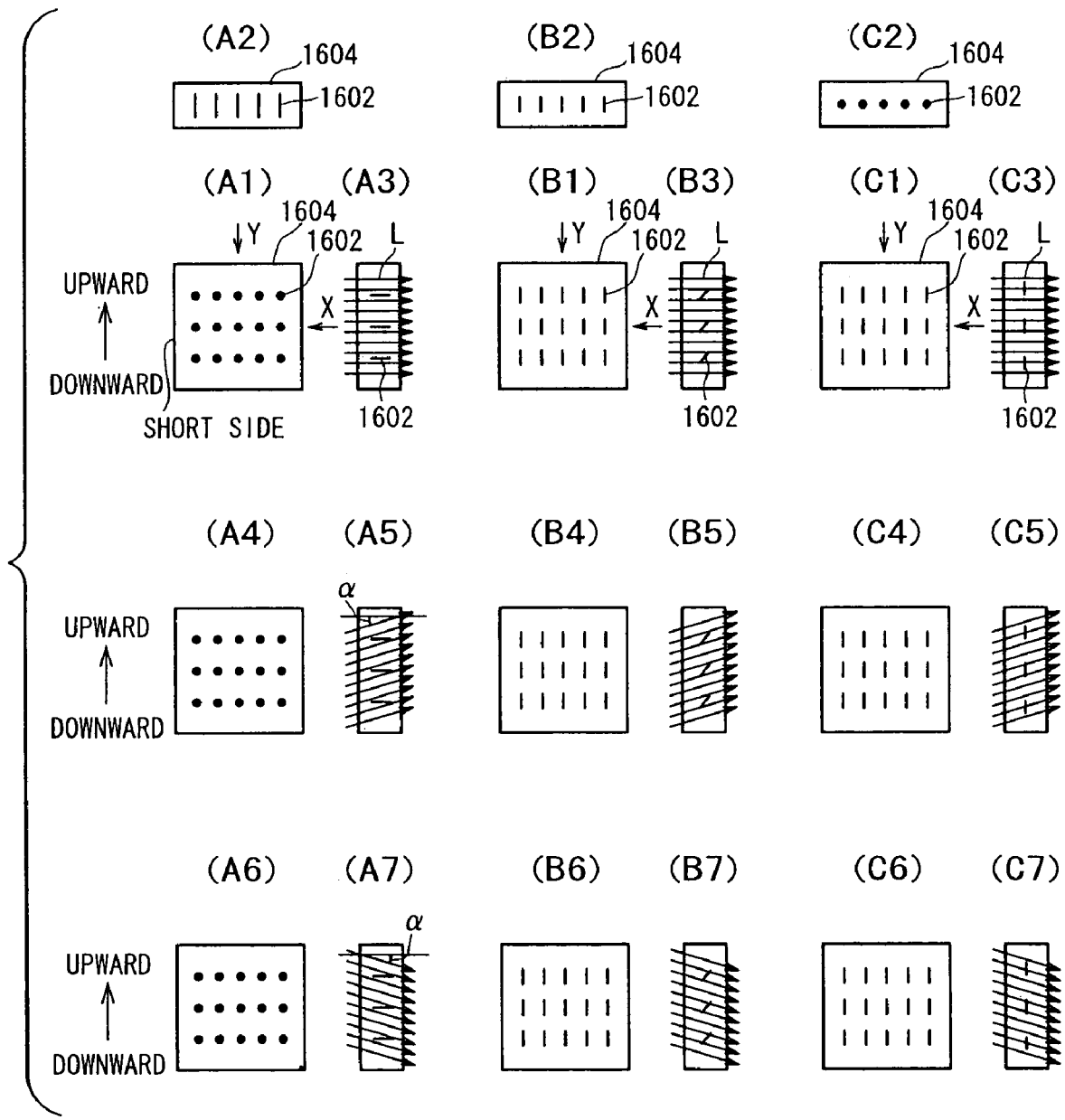
FIG. 13 is an explanatory drawing of the operation of liquid crystal light controlling device 16.
Figure 14:
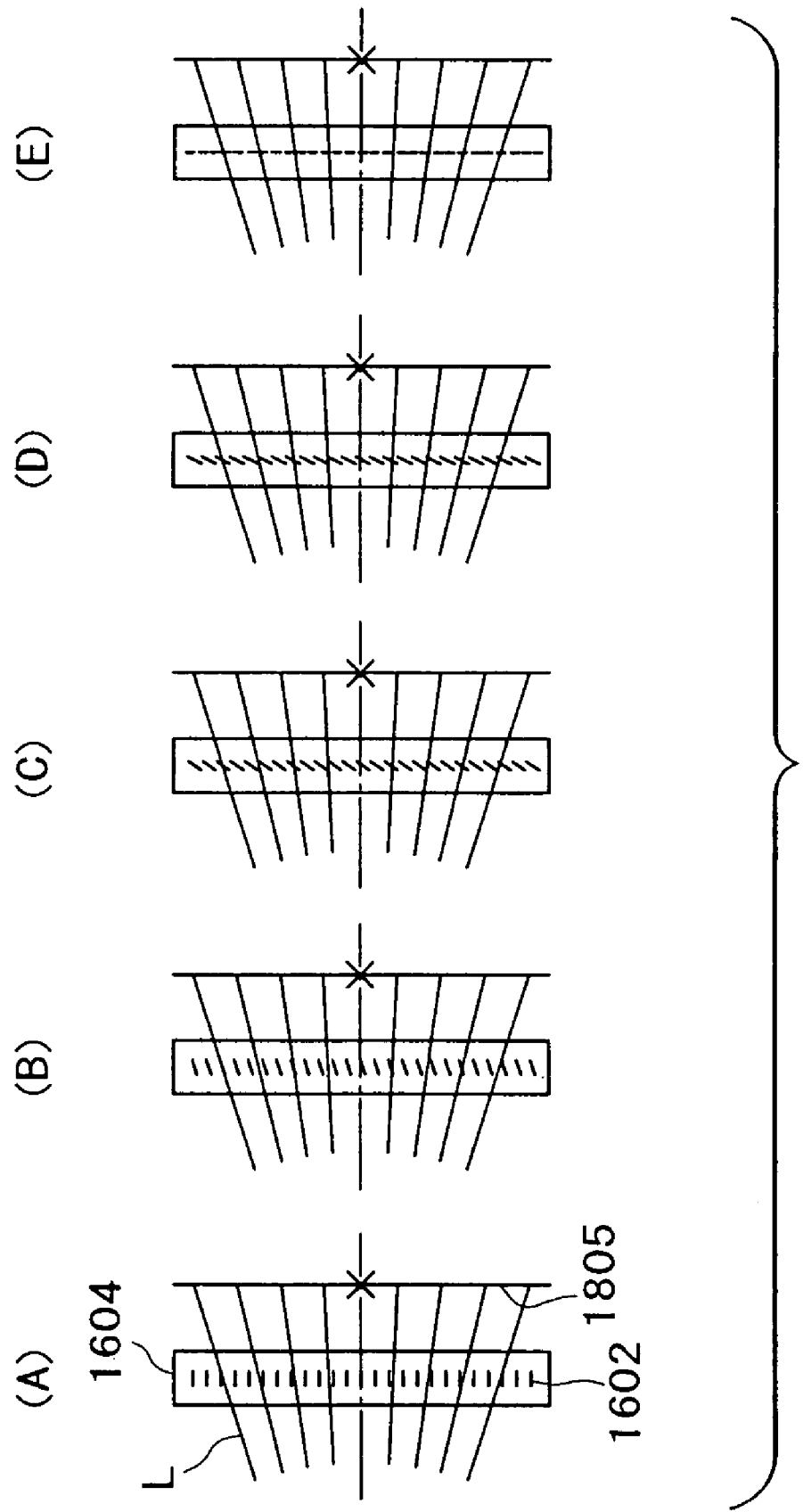
FIG. 14 is an explanatory drawing of a transmitted light quantity by liquid crystal light controlling device 16.
Figure 15:
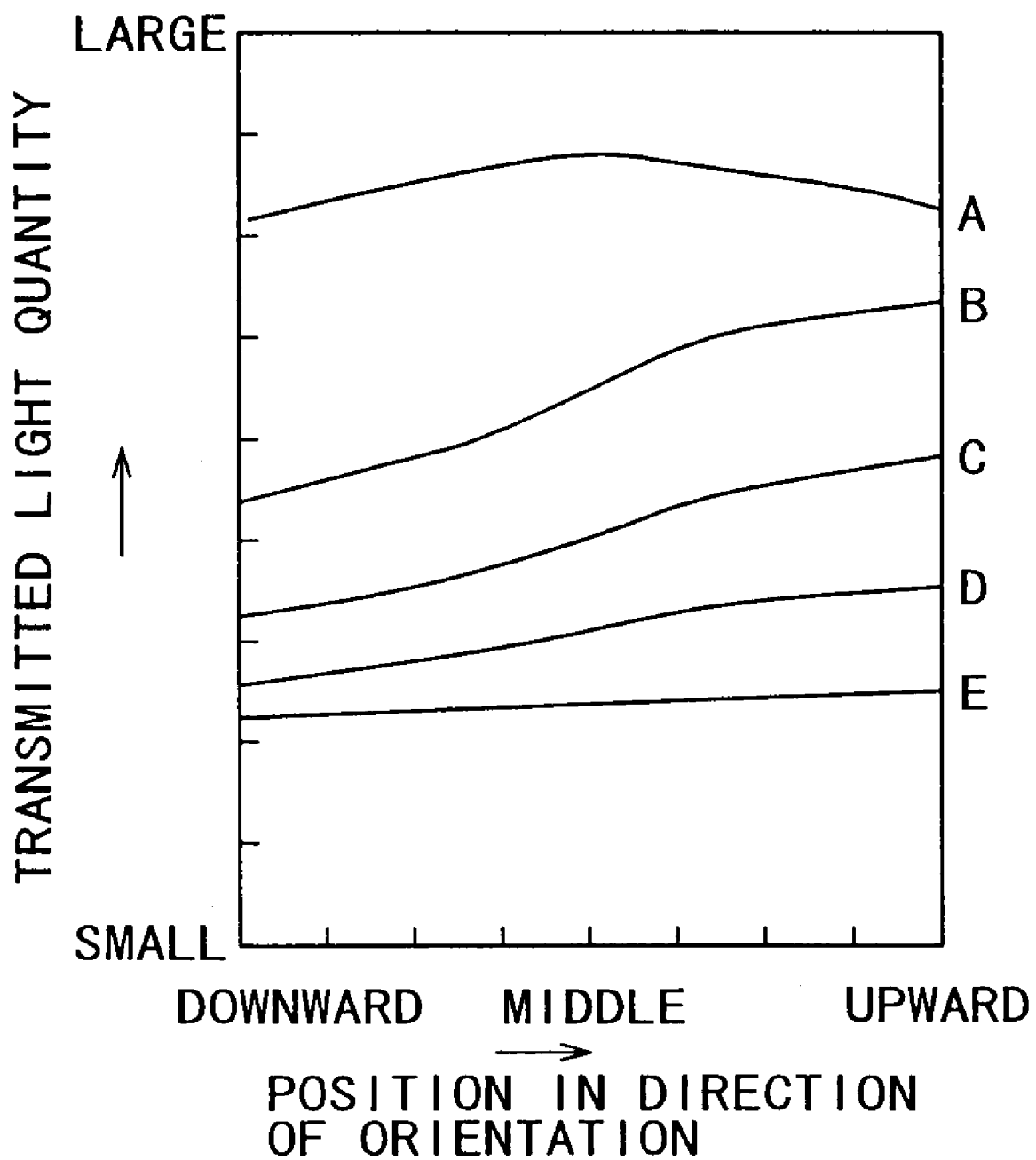
FIG. 15 is a diagram showing characteristics of the transmitted light quantity in FIG. 14.

FIG. 1 is a perspective view of the image pickup apparatus of the first embodiment seen from its front side; FIG. 2 is a perspective view of the image pickup apparatus of the first embodiment seen from its rear side; FIG. 3 is a schematic structural diagram of the lens barrel; FIG. 4 is a block diagram showing the control system of the image pickup apparatus; FIG. 5 is an exploded view in perspective of lens barrel 10; FIG. 6 is a sectional view of lens barrel 10; FIG. 7 is an assembly drawing of a rear unit including liquid crystal light controlling device 16 and image pickup device 18; FIG. 8 is a sectional view of FIG. 7; FIG. 9 is an exploded view in perspective of the rear unit; FIG. 10 is a perspective view of a presser member, FIG. 11 is a perspective view of a holding member; FIG. 12 is a perspective view of image pickup device 18; FIG. 13 is an explanatory drawing of the operation of liquid crystal light controlling device 16; FIG. 14 is an explanatory drawing of a transmitted light quantity by liquid crystal light controlling device 16; FIG. 15 is a diagram showing characteristics of the transmitted light quantity of FIG. 14; and FIG. 16 is an explanatory drawing of the relationship between the transmitted light quantity by liquid crystal light controlling device 16 and an image pickup face.

As shown in FIG. 1 and FIG. 2, image pickup apparatus 100 is a digital still camera having a case 102 in a rectangular plate form serving as its outer case. In this specification, "left/right" means "on the left/right as you face the front part of image pickup apparatus 100", and, further, with respect to the direction along the optical axis of the optical system, the side toward the subject is referred to as the "front or forward" side and the side toward the image pickup device as the "back or rearward" side.

Case 102 has lens barrel 10 incorporated therein at its right-hand side.

As shown in FIG. 3 and FIG. 5, lens barrel 10 is constructed of front unit 20 including optical system 14 and lens barrel 1406 and rear unit 22 including liquid crystal light controlling device 16 and image pickup device 18.

An image of the subject picked up by the optical system 14 is adapted so as to be transmitted by liquid crystal light controlling device 16 and led to image pickup device 18.

The optical system 14 is constructed of a front lens group 1402 and a rear lens group 1404, and these lenses 1402, 1404 are held by a lens barrel 1406.

Front lens group 1402 is arranged to look forwardly of the case 102 through a lens window 104 disposed on the front side of case 102.

Above the lens window 104, there is provided the flash 106 a flashing auxiliary light for taking an image.

On the top face to the left of case 102, there are provided a shutter button 108 and the like.

On the rear side of case 102, there are provided a display 110 (liquid crystal display) for displaying thereon images of still and moving pictures, characters, symbols, and the like, a cross-knobbed switch 112 for making various operations, a plurality of operating buttons 114, and others.

In the present embodiment, display 110 has a display screen 111 in a rectangular shape of which the long side is in agreement with the left-to-right direction and the short side is in agreement with the top-to-bottom direction and, hence, in the normal use as shown in FIG. 2, the direction of the short side of display screen 111 comes into agreement with the top-to-bottom direction of image pickup apparatus 100 and the long side of the same comes into agreement with the left-to-right direction of image pickup apparatus 100.

On the left side face of case 12, there is provided a memory receiver 118 for removably receiving a memory card 116 (storage medium) for recording images of still pictures or moving pictures or the like.

The image picked up by the image pickup device 18 is output to an image processor 120 as an image pickup signal, and, in the image processor 120, data of still pictures or moving pictures are generated based on the image pickup signal and recorded on a memory card 116. Also, the image data is displayed on the display 110 by a display processor 122.

Further, the image pickup apparatus 100 is provided with a controller 124 including a CPU and the like for controlling the image processor 120 and the display processor 122 in accordance with the operated shutter button 108, the cross-knobbed switch 112, and the operating button 114.

As shown in FIG. 5 and FIG. 6, the front unit 20 includes a holder 24, a movable ring 26, a barrel body 28, and a spring washer 30. In the present embodiment, the barrel 1406 is formed of the holder 24 and the barrel body 28.

The holder 24 has a holder body 2402 in a cylindrical wall form for holding the front lens group 1402 and three projections 2404 provided on the outer peripheral face of the holder body 2402 at intervals of 120°.

The movable ring 26 is formed in a shape of a cylindrical wall a degree larger than the holder 24, and in its peripheral wall portion 2602, there are provided three cum grooves 2604 extended in the circumferential direction.

The barrel body 28 has a cylindrical wall portion 2802 for holding rear lens group 1404 and a mounting portion 2806 in a rectangular plate shape to be connected to the rear end of the cylindrical wall portion 2802 and mounted on rear unit 22. In the cylindrical wall portion 2802, there are cut three longitudinal grooves 2804 extended in the axial direction of the cylindrical wall portion 2802 at intervals of 120° in the circumferential direction.

The front unit 20 is assembled in the following manner.

The holder 24 is put into the cylindrical wall portion 2802, and the movable ring 26 is rotatably attached onto the outer periphery of the cylindrical wall portion 2802. The three projections 2404 on the holder 24 are inserted into three longitudinal grooves 2804 provided in the cylindrical wall portion 2802 and also inserted into three cum grooves 2604 formed in the movable ring 26 extended in the circumferential direction.

In the outer peripheral face of the cylindrical wall portion 2802 of the barrel body 28, there are cut three grooves (not shown) along the circumferential direction of the cylindrical wall portion 2802, while on the inner peripheral face of the movable ring 26, there are formed three protruded portions (not shown) to be engaged with the abovementioned grooves. By having the grooves engaged with the protruded portions, the movable ring 26 is allowed to be mounted on the barrel body 28 for rotation without coming off.

Further, a spring washer 30 is fitted over the outer periphery of the cylindrical wall portion 2802 so as to be interposed between the front face of mounting portion 2806 and the rear end portion of movable ring 26. This spring urges the protruded portions on movable ring 26 into the grooves indented in barrel body 28, and, therefore, a suitable feeling of resistance can be provided when the movable ring 26 is rotated relative to the barrel body 28.

When the movable ring 26 is rotated, the three projections 2404 on the holder 24 are guided along the three cum grooves 2604 and the three longitudinal grooves 2804, and, thereby, the holder 24 is adapted so as to be shifted in the direction of the optical axis of optical system 14 (front lens group 1402 and rear lens group 1404). By the shift of holder 24, the distance between the front lens group 1402 and the rear lens group 1404 is changed, and thus the focal length of optical system 14 can be switched between the focal length for ordinary shooting and the focal length for macro shooting.

The rear unit 22 includes a holding member 32, a presser member 34, and a substrate 36, in addition to the liquid crystal light controlling device 16 and the image pickup device 18.

The liquid crystal light controlling device 16, in its entirety, has a rectangular plate form and includes, as shown in FIG. 3, two transparent substrates 1606 spaced apart along the optical axis and extended parallel to each other, two transparent electrodes 1608 formed on the surfaces of transparent substrates 1606 opposing each other, orientation films 1610 formed on the surfaces opposing each other of transparent electrodes 1608, a liquid crystal layer 1604 sealed in between two orientation films 1610, and rod-shaped liquid crystal molecules 1602 contained in the liquid crystal layer 1604. The transparent substrate 1606 is made, for example, of transparent glass.

The liquid crystal layer 1604 of liquid crystal light controlling device 16 is formed of guest-host-type cells including a host material and a guest material. The host material is formed of liquid crystal molecules 1602 and the guest material is formed of two-color dye molecules.

Although the present embodiment has the liquid crystal light controlling device 16 of a laminated two-layer structure, only one layer portion of the liquid crystal light controlling device 16 is shown in FIG. 3 to avoid the complexity of the drawing.

Liquid crystal light controlling device 16 has, as shown in FIG. 3, a front face 1614 facing the subject and a rear face 1616 facing the image pickup device 18. More specifically, as shown in FIG. 6 and FIG. 9, the front face 1614 is constituted of the front face of the transparent substrate 1606 disposed on the side toward optical system 14 of two transparent substrates 1606, while the rear face 1616 is constituted of the rear face of a transparent substrate 1606 disposed on the side away from the optical system 14 of the two transparent substrates 1606. Although the liquid crystal light controlling device 16 is transparent and members behind it can be seen through it, the liquid crystal light controlling device 16 is shown as not transparent in FIG. 9 to avoid the complication of the drawing.

At circumferential positions of the rear face 1616, or, more specifically, at positions toward each short side of the rear face 1616, there are provided two each of input terminals 1612 spaced apart in the direction of the short side, i.e., there are provided totally four input terminals 1612. Two input terminals 1612 of these four input terminals 1612 are connected to one transparent electrode 1608 of the liquid crystal light controlling device 16 and the remaining two input terminals 1612 are connected to the other transparent electrode 1608 of the liquid crystal light controlling device 16.

The input terminals 1612 are supplied with drive voltages in the manner as described below and the voltages are applied to each transparent electrode 1608 through each input terminal 1612, and, by this voltage application, the liquid crystal light controlling device 16 operates as described below.

As shown in FIG. 3, the present embodiment is designed to miniaturize the optical system 14 by reducing the length in the direction of the optical axis of front lens group 1402 and rear lens group 1404 and by reducing the outer diameter and length of barrel 1406. Therefore, for the sake of the optical design, the light beams led to image pickup device 18 from optical system 14 are gradually slanted to be separated from the optical axis as the beams come closer to image pickup device 18.

FIG. 13 explains the relationship between the slant of the direction of the major axis of the liquid crystal molecules 1602 within the liquid crystal layer 1604 and a light beam L transmitted by the liquid crystal device 16.

As described below, the relationship between the slant of the liquid crystal molecules 1602 and the light beam L transmitted by the liquid crystal light controlling device 16 is analogous to the relationship between the laths of a Venetian blind and light beams passing between the laths.

FIG. 13(A1) is a view of the liquid crystal light controlling device 16 seen from its front; FIG. 13(A2) is a view of FIG. 13(A1) seen from direction Y, being the direction of orientation of the liquid crystal molecules 1602; and FIG. 13(A3) is a view of FIG. 13(A1) seen from direction X intersecting the direction of orientation; and there are shown states where the driving voltage is not applied to the liquid crystal light controlling device 16. In the present embodiment, as shown in FIG. 13, it is arranged such that the direction of orientation of the liquid crystal light controlling device 16 is substantially parallel to the short side of the image pickup plane 1805 of an image pickup device 18.

Accordingly, the slant of the major axis of each liquid crystal molecule 1602 to the direction of thickness of liquid crystal layer 1604 is 0°. Therefore, when light L whose direction of travel is parallel to the direction of thickness of liquid crystal layer 1604 is incident, the light quantity transmitted by the liquid crystal light controlling device 16 assumes the maximum value corresponding to the angle of slant, 0°, of light L with respect to the direction of the major axis of liquid crystal molecule 1602.

FIGS. 13(B1), (B2), and (B3) are diagrams similar to FIGS. 13(A1), (A2), and (A3) but in FIGS. 13(B1), (B2), and (B3) states are shown where an intermediate driving voltage is applied to the liquid crystal light controlling device 16.

Accordingly, the angle of slant of the major axis of each liquid crystal molecule 1602 assumes, for example, an angle of 45° with respect to the direction of thickness of liquid crystal layer 1604. Hence, when light L whose direction of travel is parallel to the direction of thickness of liquid crystal layer 1604 is incident, the light quantity transmitted by the liquid crystal light controlling device 16 assumes an intermediate value corresponding to the angle of slant, 45°, of light L with respect to the direction of major axis of liquid crystal molecule 1602.

FIGS. 13(C1), (C2), and (C3) are diagrams similar to FIGS. 13(A1), (A2), and (A3), but in FIGS. 13(C1), (C2), and (C3) states are shown where a maximum driving voltage is applied to the liquid crystal light controlling device 16.

Accordingly, the angle of slant of the major axis of each liquid crystal molecule 1602 assumes an angle of 90° with respect to the direction of thickness of liquid crystal layer 1604. Hence, when light L whose direction of travel is parallel to the direction of thickness of liquid crystal layer 1604 is incident, the light quantity transmitted by the liquid crystal light controlling device 16 assumes a minimum value corresponding to the angle of slant 90° of light L with respect to the direction of the major axis of liquid crystal molecule 1602.

Now, cases in which the direction of travel of light L is slanted with respect to the direction of thickness of the liquid crystal layer 1604, while angles of slant of the direction of the major axis of each liquid crystal molecule 1602 are set at 0°, 45°, and 90° with respect to the direction of thickness of the liquid crystal layer 1604, will be described.

For convenience of explanation, one of the directions referring to the orientation in direction Y may herein after be defined as "upward" and the other direction may be referred to as "downward" as shown in FIG. 13.

Cases where the direction of travel of light L is at an upwardly slanted angle α with respect to the direction of thickness of liquid crystal layer 1604 are shown in FIGS. 13(A4), (A5); 13(B4), (B5); and FIGS. 13(C4), (C5). Concerning the angle of slant of the major axis of liquid crystal molecule 1602, FIGS. 13(A4), (A5) are identical to FIGS. 13(A1), (A3); FIGS. 13(B4), (B5) are identical to FIGS. 13(B1), (B3); and FIGS. 13(C4), (C5) are identical to FIGS. 13(C1), (C3).

On the other hand, cases where the direction of travel of light L is at an downwardly slanted angle α with respect to the direction of thickness of liquid crystal layer 1604 are shown in FIGS. 13(A6), (A7); 13(B6), (B7); and FIGS. 13(C6), (C7). Concerning the angle of slant of the major axis of liquid crystal molecule 1602, FIGS. 13(A6), (A7) are identical to FIGS. 13(A1) (A3); FIGS. 13(B6), (B7) are identical to FIGS. 13(B1), (B3) and FIGS. 13(C6), (C7) are identical to FIGS. 13(C1), (C3).

From these drawings, it is known that when the direction of travel of light L with respect to the direction of the thickness of the liquid crystal layer 1604 changes, the direction of travel of light L with respect to the direction of the major axis of the liquid crystal molecule 1602 also changes, even if the angles of slant of the direction of the major axis of the liquid crystal molecule 1602 with respect to the direction of the thickness of the liquid crystal layer 1604 are the same.

As mentioned above, light L emitted from optical system 14 gradually deviates from the optical axis as light L comes closer to the image pickup device 18. Therefore, the angle of slant of the travel of light L with respect to the direction of the thickness of the liquid crystal layer 1604 varies in accordance with the position on the liquid crystal light controlling device 16. Accordingly, the quantity of light L transmitted by the liquid crystal light controlling device 16 also varies in accordance with the position. This will further be discussed below.

FIGS. 14A to 14E show the angle of slant of the liquid crystal molecule 1602 with respect to the direction of the thickness of the liquid crystal layer 1604 gradually increasing in the range between 0° to 90°.

In FIG. 15, positions on the liquid crystal light controlling device 16 in the direction of orientation (direction Y) are taken along the horizontal axis, and quantities of light L transmitted by the liquid crystal light controlling device 16 are taken along the vertical axis, in which numerals A-E correspond to FIGS. 14A to 14E.

FIGS. 15A to 15E show that the light quantity transmitted by the liquid crystal light controlling device 16 varies in accordance with positions on the liquid crystal light controlling device 16 in the direction of orientation (direction Y). In particular, it is known from FIGS. 15B to 15E, excepting the case where the slant of the major axis of a liquid crystal molecule 1602 is 0°, that the light quantity transmitted by the liquid crystal light controlling device 16 increases or decreases monotonously (in a stepless manner or continuously) in accordance with the positions in the direction of orientation (direction Y) on the liquid crystal light controlling device 16.

Now, let it be considered that an image of a subject having uniform brightness is picked up and light beams with uniform brightness from the optical system 14 are rendered incident on the liquid crystal light controlling device 16 in the state where the angle of slant of the direction of the major axis of a liquid crystal molecule 1602 in the liquid crystal light controlling device 16 is varied as shown in FIGS. 14B to 14E.

Figure 16A:
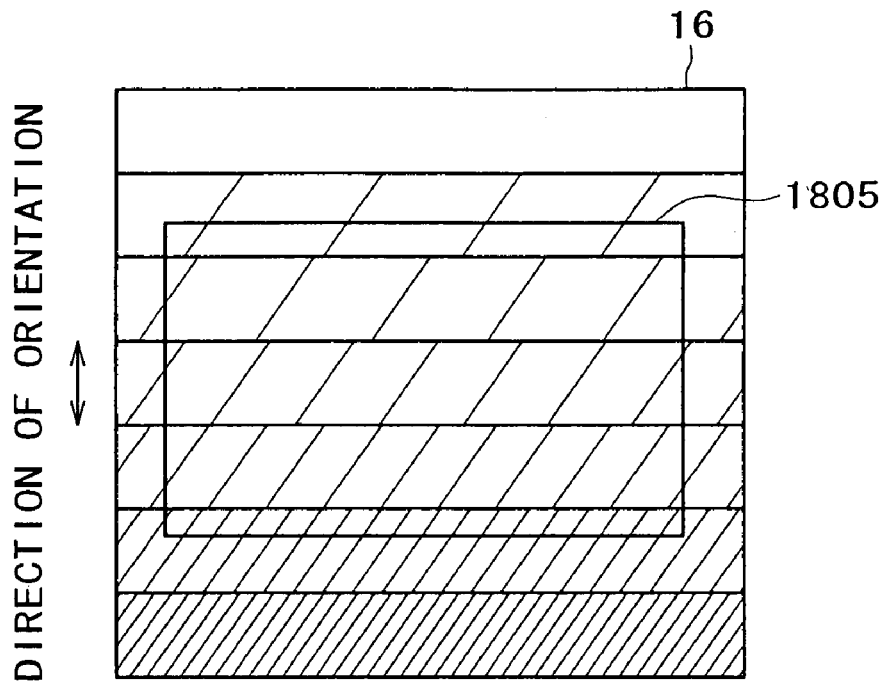
FIG. 16 is an explanatory drawing of the relationship between the transmitted light quantity by liquid crystal light controlling device 16 and an image pickup plane.
Figure 16B:
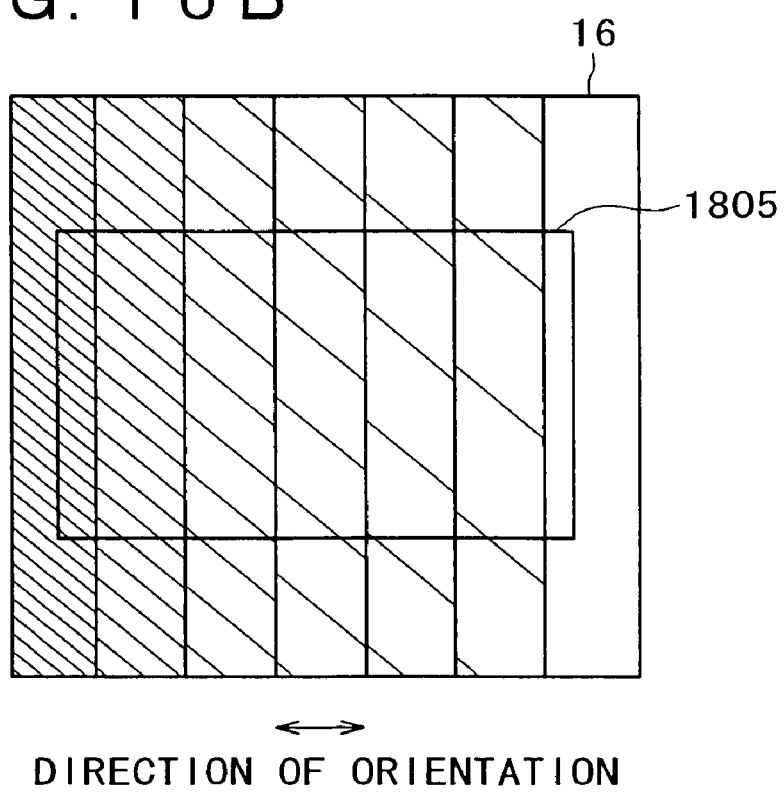

FIG. 16 shows relative positions between the image pickup plane 1805 and the liquid crystal light controlling device 16, in which FIG. 16A shows a state where the direction of orientation of the liquid crystal light controlling device 16 is parallel to the direction of the short side of the image pickup plane 1805, while FIG. 16B shows a case where the direction of orientation of the liquid crystal light controlling device 16 is parallel to the direction of the long side of the image pickup plane 1805.

Referring to FIGS. 16A and 16B, the density of the hatching indicates the level of the light quantity transmitted by the liquid crystal light controlling device 16. More particularly, the thinner the hatching, the larger is the transmitted light quantity, and the denser the hatching, the smaller is the transmitted light quantity. Incidentally, while there are no border lines present between actual transmitted light quantities, for convenience of explanation, border lines are drawn in FIG. 16 between the hatchings indicating different densities.

In the case of either FIG. 16A or FIG. 16B, the transmitted light quantity is varying in the direction of the short side or the long side. Such variation of the transmitted light quantity affects the brightness of the picked-up image and makes the brightness of the image unnatural.

Now, if FIG. 16A is compared with FIG. 16B, the variation of the transmitted light quantity in FIG. 16A, in which the transmitted light quantity is varying along the short side, is smaller than the variation of the transmitted light quantity in FIG. 16B, in which the transmitted light quantity is varying along the long side.

In the present embodiment, the orientation of the liquid crystal light controlling device 16 is arranged to be substantially parallel to the short side of the image pickup plane 1805. Therefore, even if light L emitted from optical system 14 tends to gradually separate from the optical axis as the light beams come closer to the image pickup device 18 on account of the design to realize miniaturization of optical system 14, variation of the light quantity transmitted by the liquid crystal light controlling device 16 in the present embodiment becomes smaller than when the orientation of the liquid crystal light controlling device 16 is arranged substantially parallel to the long side of the image pickup plane 1805. Thus, the effect of variation of the transmitted light quantity on the brightness of an image can be decreased and hence an advantage can be obtained when the picked-up image is displayed on the display 110 as shown in FIG. 2 that an unnatural difference between light and darkness of the displayed image becomes inconspicuous to the sense of sight.

More specifically, since the direction of the short side of the image pickup plane 1805 in the rectangular shape of the image pickup device 18 and the direction of the short side of the display screen 111 of the display 110 are corresponding to each other, the difference between light and darkness in the image displayed on the display screen 111 of the display 110 picked up by the image pickup device 18 will be produced in the direction of the short side of the display screen 111. Accordingly, the difference between light and darkness in the image can be made smaller in the case where the difference between light and darkness in the image displayed on the display screen 111 is produced in the direction of the short side of the display screen 111 than where the difference between light and darkness in the image displayed on the display screen 111 is produced in the direction of the long side of the display screen 111.

Further, the effect of the reduction in the difference between light and darkness of the image becomes greater the larger is the ratio between the long side and the short side of the image pickup plane 1805.

By virtue of the effect making the unnatural difference between light and darkness in a picked-up image inconspicuous to the sense of sight, optical system 14 can be made advantageously still smaller in size, and, further, an image pickup apparatus having the barrel 10 and various mobile equipment units incorporating the lens barrel 10 can be made smaller in size to great advantage.

Also, when a picked-up image is output as a print on a rectangular region, the effect of making the unnatural difference between light and darkness inconspicuous provides an advantage, as when the image is displayed on the display 110.

Concerning the characteristics of human visual sensation, it is known by experience that unnaturalness to the sense of sight in the case where brightness of an image gradually changes to darkness from top to bottom of the image is smaller than where, reversely, darkness of the image gradually changes to brightness from top to bottom of the image.

Accordingly, when the direction from top to bottom (vertical direction) of the image picked up by the image pickup device 18 of an image pickup apparatus is substantially parallel to the short side of image pickup plane 1805 of image pickup device 18, if the direction of orientation of liquid crystal light controlling device 16 is arranged such that the light quantity transmitted by the liquid crystal light controlling device 16 may be lowered monotonously (in a step-less manner or continuously) from the top to the bottom of the vertical direction of the picked-up image, it will follow that the brightness of the image is lowered gradually from the top to the bottom of the vertical direction of the picked-up image by the image pickup device 18. This offers a great advantage in mitigating the unnatural difference between light and darkness of the image picked up by the image pickup device 18.

As shown in FIG. 9, the holding member 32 includes four side walls 3202 arranged to surround four end faces of the liquid crystal light controlling device 16 and two rear walls 3204, connected to the rear end of the side walls 3202 and arranged to face four input terminals 1612 of the liquid crystal light controlling device 16, and, further, an opening 3206 in a rectangular shape is formed between two rear walls 3204.

On the inner side of the four side walls 3202, there are provided a plurality of ribs 3208. Positioning and securing the liquid crystal light controlling device 16 in position within the holding member 32 is attained by bringing these ribs 3208 into abutment on the four side faces of the liquid crystal light controlling device 16.

As shown in FIG. 11, which shows holding member 32 in a state with a portion broken away, there are provided four conducting portions 3210 at positions of rear walls 3204 corresponding to each of the input terminals 1612 in such a manner as to pass through the thickness of the rear wall 3204. In other words, the conducting portions 3210 are extended parallel to the direction of the optical axis of the optical system 14.

The conducting portion 3210 is made of a conductive material conventionally used for connecting electrodes of liquid crystal devices. The conductive material, called "dot connector" or "Zebra rubber", is formed by having conductive particles dispersed in an insulating material such as rubber. As the conductive material, anisotropic conductive material (ACM) also may be used for forming the conducting portion 3210, in which case the conducting portion 3210 is arranged to have conductivity in its elongated direction (direction of connection) and to have no conductivity in the direction perpendicular to the elongated direction.

The side walls 3202 and rear walls 3204 are formed on an insulating material having adhesiveness and elasticity, such as silicone rubber.

It is also possible to form the whole of the rear walls 3204 as a conductive member. In such a case, the conducting member is formed of an anisotropic conductive material having conductivity in the direction of thickness of rear wall 3204 and having no conductivity in the direction perpendicular to the direction of thickness.

The presser member 34, as shown in FIG. 9 and FIG. 10, includes a plate portion 3402 formed into a rectangular plate shape a size larger than the contour of the holding member 32 and the opening 3404 provided in the center of the plate portion 3402.

Rearwardly of two short sides of plate portion 3402 are projected two engagement pieces 3406. At positions on the rear face of plate portion 3402 closer to the two short sides, there are provided protruded portions 3408 bulgingly extended in the direction of the short side.

As shown in FIG. 6, FIG. 9, and FIG. 12, the image pickup device 18 includes a package 1802 in a rectangular plate form, a sensor portion 1804 received in a rectangular recess formed in the center of the front side of package 1802 for picking up an image of a subject, and a cover glass 1806 attached to the front face of package 1802 for hermetically sealing the sensor portion 1804 held in the rectangular recess. The package 1802 is made, for example, of a ceramic material.

The sensor portion 1804 is formed, for example, of a rectangular plate-shaped chip constituting a CCD image sensor, and, as shown in FIG. 8, its front face is arranged to provide an image pickup plane 1805 in a rectangular shape. In the present embodiment, the long side and the short side of image pickup plane 1805 are disposed parallel to the long side and the short side of package 1802.

On the end faces of package 1802 on the sides of its two short sides, there are provided engagement portions 1810 to be engaged with and disengaged from engagement pieces 3406 of presser member 34.

The package 1802, as shown in FIG. 12, has a frame portion 1814 in a rectangular frame shape surrounding the sensor portion 1804 and the frame portion 1814 has a front face 1803 in a frame shape facing the liquid crystal light controlling device 16.

At positions on the package 1802 facing the liquid crystal light controlling device 16, i.e., at positions on the front face 1803 toward its two short sides, there are disposed four output terminals 1808, corresponding to four input terminals 1612, for supplying driving voltages to the input terminals 1612 of the liquid crystal light controlling device 16. The positions on the front face 1803 of the package 1802 where output terminals 1808 are disposed are portions corresponding to input terminals 1612.

As shown in FIG. 12, on two end faces on the sides toward the long sides of package 1802, there are provided a plurality of terminals 1812 for inputting and outputting electric signals including image pickup signals to and from the sensor portion 1804. At four corner portions of package 1802, there are provided four connection terminals 1813 for driving signals, each being electrically coupled with each of four output terminals 1808 within package 1802. The terminals 1812 and a driving-signal connection terminal 1813 are provided, for example, by plated layers with gold or the like formed on the surface of grooves cut in the surface of package 1802.

The substrate 36 is formed in a rectangular plate shape having a size a step larger than the image pickup device 18.

The front face of substrate 36 is attached to the rear face of the image pickup device 18 with an adhesive or the like, while the terminals 1812 and the inputting connection terminals 1813 on image pickup device 18 are connected with terminals, not shown, provided on the front face of the substrate 36 by soldering.

On the rear face of substrate 36, there are provided a circuit for processing the image pickup signal by inputting and outputting electric signals including the image pickup signal to and from the sensor portion 1804 and a circuit for applying the driving voltage to the liquid crystal light controlling device 16. To the rear face of the substrate 36 is connected a flexible substrate 37. Through this substrate 37, transmission and reception of various signals between an outside control circuit and the circuits on substrate 36 are performed. The circuits disposed on substrate 36 may be disposed otherwise on the flexible substrate 37.

The rear unit 22 is assembled as follows.

The holding member 32 is mounted on the front face of the image pickup device 18 attached onto the substrate 36 with solder, the liquid crystal light controlling device 16 is put into the interior of four side walls 3202 of that mounted holding member 32, the presser member 34 is placed over the same, and the two engagement pieces 3406 are brought into engagement with the engagement portions 1810 of image pickup device 18.

By having the presser member 34 engaged with the image pickup device 18, the liquid crystal light controlling device 16 and the holding member 32 are held as sandwiched between the plate portion 3402 of the presser member 34 and front face 1803 of the image pickup device 18. More specifically, the liquid crystal light controlling device 16 is attached to the front face 1803 of the image pickup device 18, with the perimeter of the rear face 1616 thereof held by the holding member 32.

At this time, a space facing opening 3206 is formed between the rear face 1616 of the liquid crystal light controlling device 16 and the front face 1803 of the package 1802 of the image pickup device 18 because the rear wall 3204 of the holding member 32 is sandwiched there between. However, this space is covered by side walls 3202 and the rear wall 3204 of the holding member 32.

Thereby, the portion on the rear side of the conducting portion 3208 of the holding member 32 is pressed against the output terminals 1808 of the package 1802 and the portion on the front side of the conducting portion 3208 of the holding member 32 is pressed against the input terminals 1612 of the liquid crystal light controlling device 16.

In other words, the conducting portion 3208 is formed of a first portion at which the holding member 32 contacts the input terminals 1612, a second portion at which it contacts the later-discussed output terminals 1808 of the image pickup device 18, and a third portion of holding member 32 connecting the first portion with the second portion.

Then, the protruded portions 3408 of the presser member 34 are pressed on the portions of the liquid crystal light controlling device 16 corresponding to the input terminals 1612 as shown in FIG. 8, whereby contact under pressure of the conducting portion 3208 with the input terminals 1612 of the liquid crystal light controlling device 16 and contact under pressure of the conducting portion 3208 with the output terminals 1808 of the package 1802 can be ensured.

Fixing of the front unit 20 to the rear unit 22 is attained by bonding them together with an adhesive while the mounting portion 2806 of the barrel body 28 is brought into abutment with the front face of plate portion 3402 of presser member 34.

The functioning and effects of the first embodiment will be described below.

When the driving voltage to be applied to the liquid crystal light controlling device 16 is generated by the circuit on the substrate 36, the driving voltage is supplied from terminals on substrate 36 to the output terminals 1808 on package 1802 through four connection terminals 1813 for driving signals on package 1802. The driving voltage is then supplied from the output terminals 1808 to the input terminals 1612 of the liquid crystal light controlling device 16 through the conducting portion 3208 of holding member 32, whereby the driving voltage is applied to each of the transparent electrodes 1608 of the liquid crystal light controlling device 16.

In the liquid crystal light controlling device 16, the transmitted light quantity (transmittance of light) is adjusted in accordance with the applied driving voltage.

According to the first embodiment, the output terminals 1808 for supplying the driving voltage to the input terminals 1612 of the liquid crystal light controlling device 16 are disposed at positions facing the liquid crystal light controlling device 16 of package 1802 of image pickup device 18. Accordingly, the need for securing space around package 1802 of the image pickup device 18, especially at the sides of package 1802, for the sake of connecting the input terminals 1612 with the output terminals 1808 can be eliminated, and this provides an advantage in miniaturizing the apparatus.

Further, in the first embodiment, the driving voltage is adapted so as to be supplied from the output terminals 1808 to the input terminals 1612 through the conducting portion 3208 provided on the holding member 32 for holding the liquid crystal light controlling device 16, and, hence, the number of components for supplying the driving voltage can be reduced, and this provides an advantage in attaining simplification of structure and reduction of cost.

Further, since the liquid crystal light controlling device 16 is held by the holding member 32, when the image pickup apparatus 100 is given a shock, the shock to the liquid crystal light controlling device 16 can be lessened, and this provides an advantage in preventing the liquid crystal light controlling device 16 from being damaged.

Further, since the space formed between the rear face 1616 of the liquid crystal light controlling device 16 and the front face 1803 of the package 1802 of the image pickup device 18 is covered by the side walls 3202 and the rear wall 3204 of holding member 32, an advantage can be obtained in which light beams led into the image pickup device 18 are prevented from being degraded by dust entering the space.

Second Embodiment

A second embodiment will be described.

The second embodiment is different from the first embodiment in that the holding member 32 and the presser member 34 have been eliminated and the liquid crystal light controlling device 16 is attached directly to the image pickup device 18.

Figure 17:
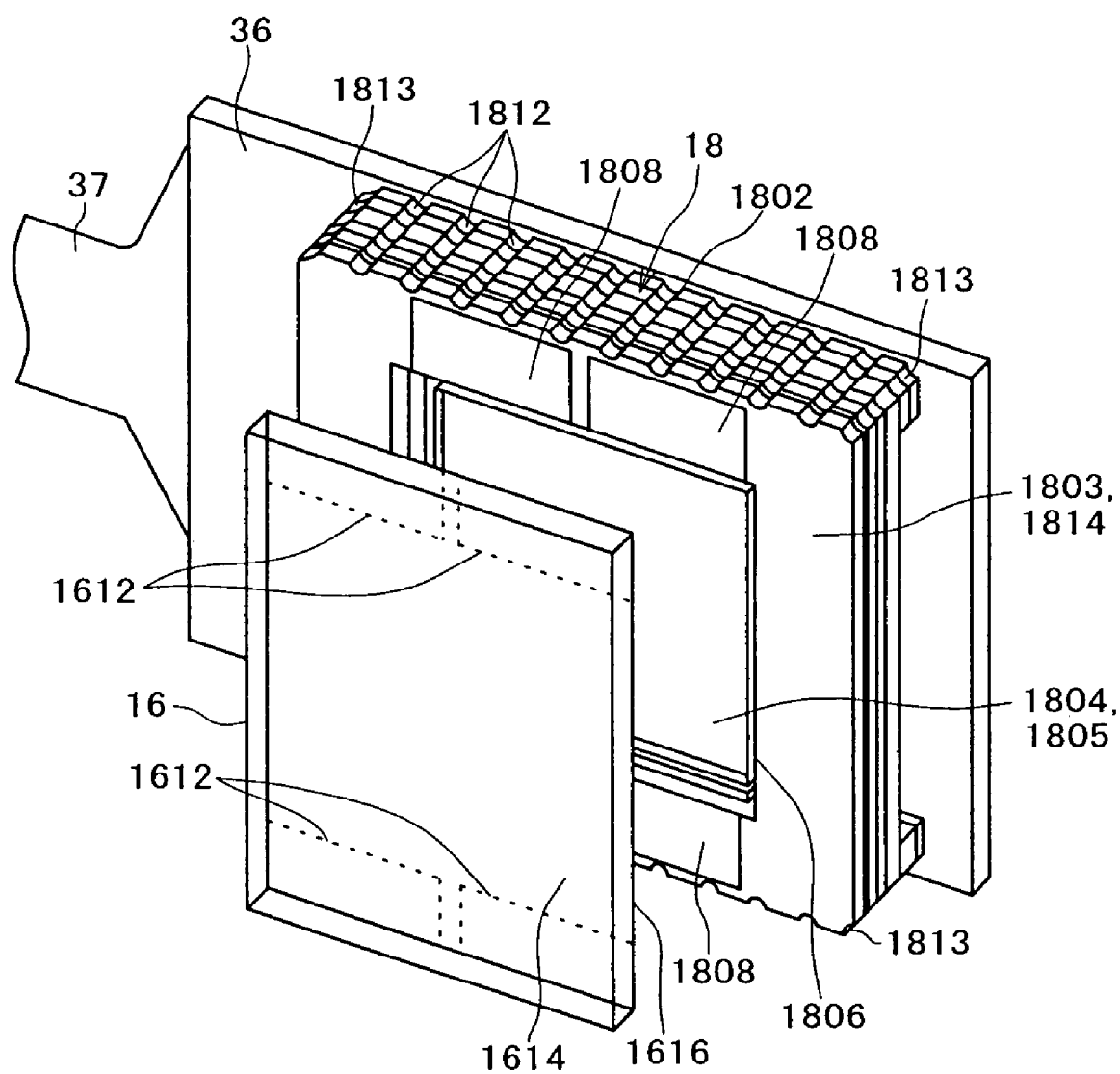
FIG. 17 is an exploded view in perspective of a rear unit of a second embodiment.
Figure 18:
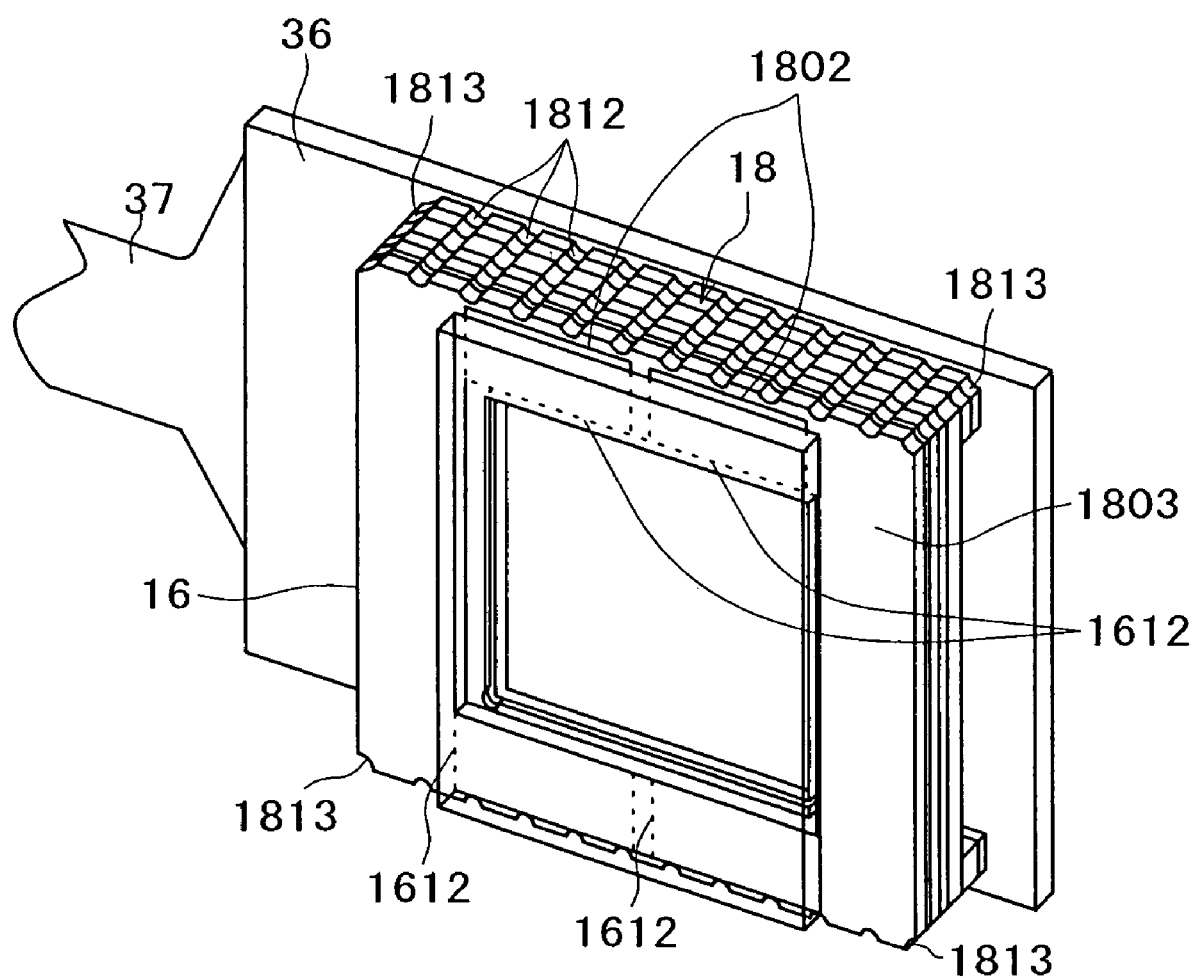
FIG. 18 is an assembly drawing of the rear unit of the second embodiment.

FIG. 17 is an exploded view in perspective of the rear unit in the second embodiment, and FIG. 18 is an assembly drawing of the rear unit. Components corresponding to those in the first embodiment will herein after be denoted by corresponding reference marks and an explanation of the same will be omitted. Though, as shown in FIG. 18, the liquid crystal light controlling device 16 is transparent and allows things behind it to be seen through it, the liquid crystal light controlling device 16 is shown as not transparent in FIG. 17 for avoiding complicating the drawing.

As shown in FIG. 17 and FIG. 18, output terminals 1808 of image pickup device 18 are disposed at circumferential positions of the front face 1803 of the package 1802. Further, the four input terminals 1612 of the liquid crystal light controlling device 16 are disposed at circumferential positions of the rear plane 1616 corresponding to the four output terminals 1808.

Although positions of output terminals 1808 and input terminals 1612 in the second embodiment are shown as rotated 90° around the optical-axis of optical system 14 from positions of output terminals 1808 and input terminals 1612 in the first embodiment, they are not different from each other in functioning.

Assembly of the rear unit 22 is attained by attaching the liquid crystal light controlling device 16 to the image pickup device 18 by adhesion of the input terminals 1612 of the liquid crystal light controlling device 16 to their corresponding output terminals 1808 of the image pickup device 18 with a conductive adhesive.

As the above-mentioned conductive adhesive, an anisotropic conductive adhesive can be used. An anisotropic conductive adhesive is one that has conductivity in the direction of distance between input terminals 1612 and output terminals 1808 and has no conductivity in the direction crossing the direction of distance at right angles.

In such a construction, the input terminals 1612 and the output terminals 1808 are electrically connected by the conductive adhesive so that the driving voltage is supplied from the output terminals 1808 to the input terminals 1612 through the conductive adhesive.

According to the second embodiment, the need for securing space around package 1802 of the image pickup device 18, especially at the sides of package 1802, for the sake of connecting the input terminals 1612 with the output terminals 1808 can be eliminated, as with the first embodiment, and this provides an advantage in miniaturizing the apparatus.

Further, in the second embodiment, the holding member 32, the conducting portion 3208, and the presser member 34 as used in the first embodiment can be eliminated. Therefore, the number of components for supplying driving voltage can be reduced further and a great advantage can be obtained in simplifying the structure and reducing the cost.

As the conductive adhesive for connecting the input terminals 1612 of the liquid crystal light controlling device 16 with their corresponding output terminals 1808 of the image pickup device 18 in the second embodiment, one using a binder hardening under ultra violet irradiation, for example, may be used.

Further, as the conductive adhesive, an anisotropic conductive adhesive film (ACF) having the property similar to that of the above-mentioned anisotropic conductive material can be used.

Third Embodiment

A third embodiment will be described below.

The third embodiment differs from the first embodiment in that it has eliminated the use of the holding member 32, and, instead, uses a conductive member 38 for connecting the output terminals with the input terminals.

Figure 19:
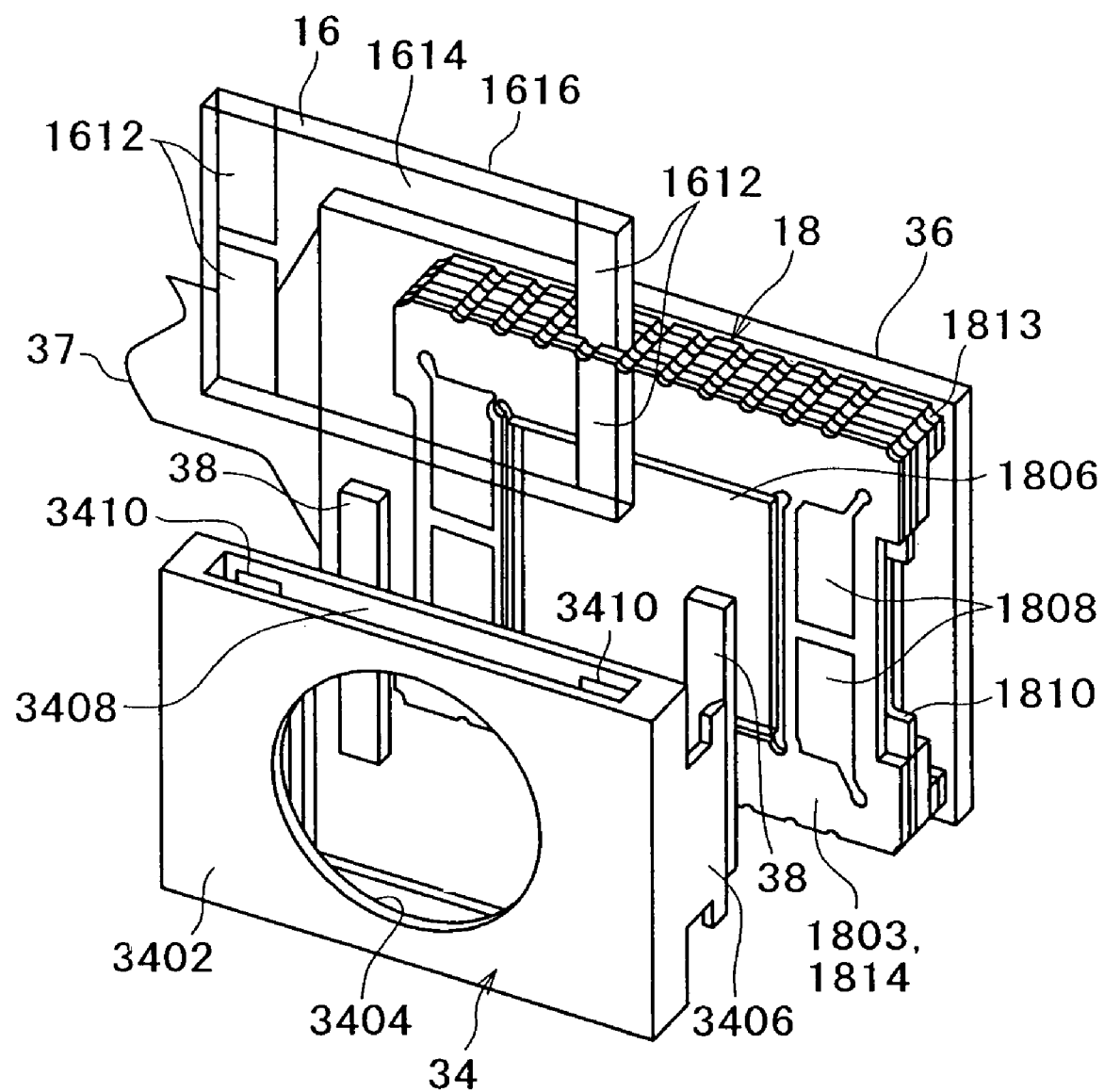
FIG. 19 is an exploded view in perspective of a rear unit of a third embodiment.
Figure 20:
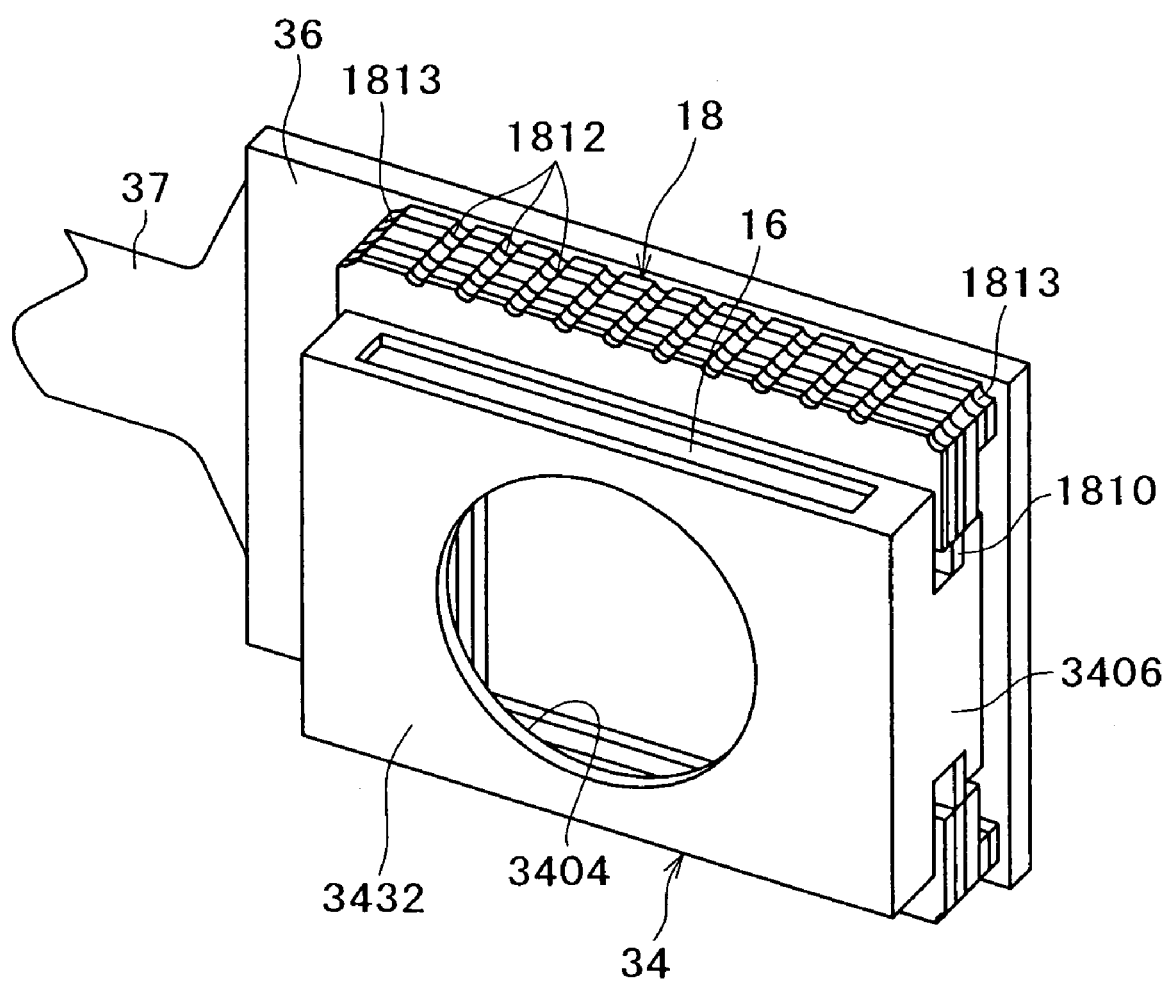
FIG. 20 is an assembly drawing of the rear unit of the third embodiment.

FIG. 19 is an exploded view in perspective of the rear unit of the third embodiment, and FIG. 20 is an assembly drawing of the rear unit.

As shown in FIG. 19 and FIG. 20, the rear unit 22 includes image pickup device 18, the liquid crystal light controlling device 16, the presser member 34, and two conductive members 38.

Four output terminals 1808 of the image pickup device 18 are disposed at circumferential positions of the front face 1803 of package 1802. Further, the input terminals 1612 of the liquid crystal light controlling device 16 are disposed at circumferential positions corresponding to four output terminals 1808 of the rear face 1616.

The conductive members 38 are formed in a band shape having a length substantially equal to the dimension of the short side of the rear face 1616 of the liquid crystal light controlling device 16 and adapted to be conductive in the direction of thickness crossing the direction of the length at right angles and not conductive in the direction of the length.

The presser member 34 has plate portion 3408, in addition to the plate portion 3402 of the first embodiment, disposed at the rear of the plate portion 3402 and formed in a rectangular shape parallel to plate portion 3402. Between the plate portion 3402 and the plate portion 3408, there is sandwiched the liquid crystal light controlling device 16 with its direction of thickness at right angles to the plate portions.

Further, long narrow openings 3410, elongated in the direction of the short side, are cut in plate portion 3408 at positions toward the two short sides for the holding conductive members 38.

The rear unit 22 is assembled as follows.

The liquid crystal light controlling device 16 is inserted between plate portion 3408 and plate portion 3402 of the presser member 34 such that the input terminals 1612 of the liquid crystal light controlling device 16 face the openings 3410.

The conductive members 38 are each held in each of the openings 3410 and the presser member 34 is placed over the image pickup device 18 such that the conductive members 38 are disposed between positions on the front face 1803 of the image pickup device 18 including the output terminals 1808 and positions on the rear face 1616 of the liquid crystal light controlling device 16 including the input terminals 1612, whereby two engagement pieces 3406 are engaged with the engagement portions 1810 of the image pickup device 18.

Thus, the liquid crystal light controlling device 16 is retained by the image pickup device 18, while the conductive member 38 is interposed between positions on the front face 1803 of the image pickup device 18 including the output terminals 1808 and positions on the rear face 1616 of the liquid crystal light controlling device 16 including the input terminals 1612 with the direction of its length oriented parallel to the direction of the short side of rear face 1616 of the liquid crystal light controlling device 16 and with the direction of its thickness oriented perpendicular to the rear face 1616 of liquid crystal light controlling device 16 and the front face 1803 of the image pickup device 18.

Thus, positions on the rear face of the conductive member 38 are pressed against the output terminals 1808 of the package 1802 and portions on the front face of conductive member 38 are pressed against the input terminals 1612 of the liquid crystal light controlling device 16.

By virtue of such a configuration, the input terminals 1612 and the output terminals 1808 can be electrically connected by conductive member 38, and the driving voltage can be supplied from the output terminals 1808 to the input terminals 1612 through the conductive member 38.

According to the third embodiment, the need for securing space around the package 1802 of the image pickup device 18, especially at the sides of the package 1802, for the sake of connecting the input terminals 1612 with the output terminals 1808, can be eliminated, as with the first and second embodiments, and this provides an advantage in miniaturizing the apparatus.

Further, since in the third embodiment, the conductive member 38 is used while the holding member 32 used in the first embodiment has been eliminated, a great advantage can be obtained in lowering the component count and reducing the cost.

Fourth Embodiment

A fourth embodiment will be described below.

The fourth embodiment differs from the first embodiment in that the holding member 32 and the presser member 34 have been eliminated and the liquid crystal light controlling device 16 is attached to the image pickup device 18 by means of a conducting member 40.

Figure 22:
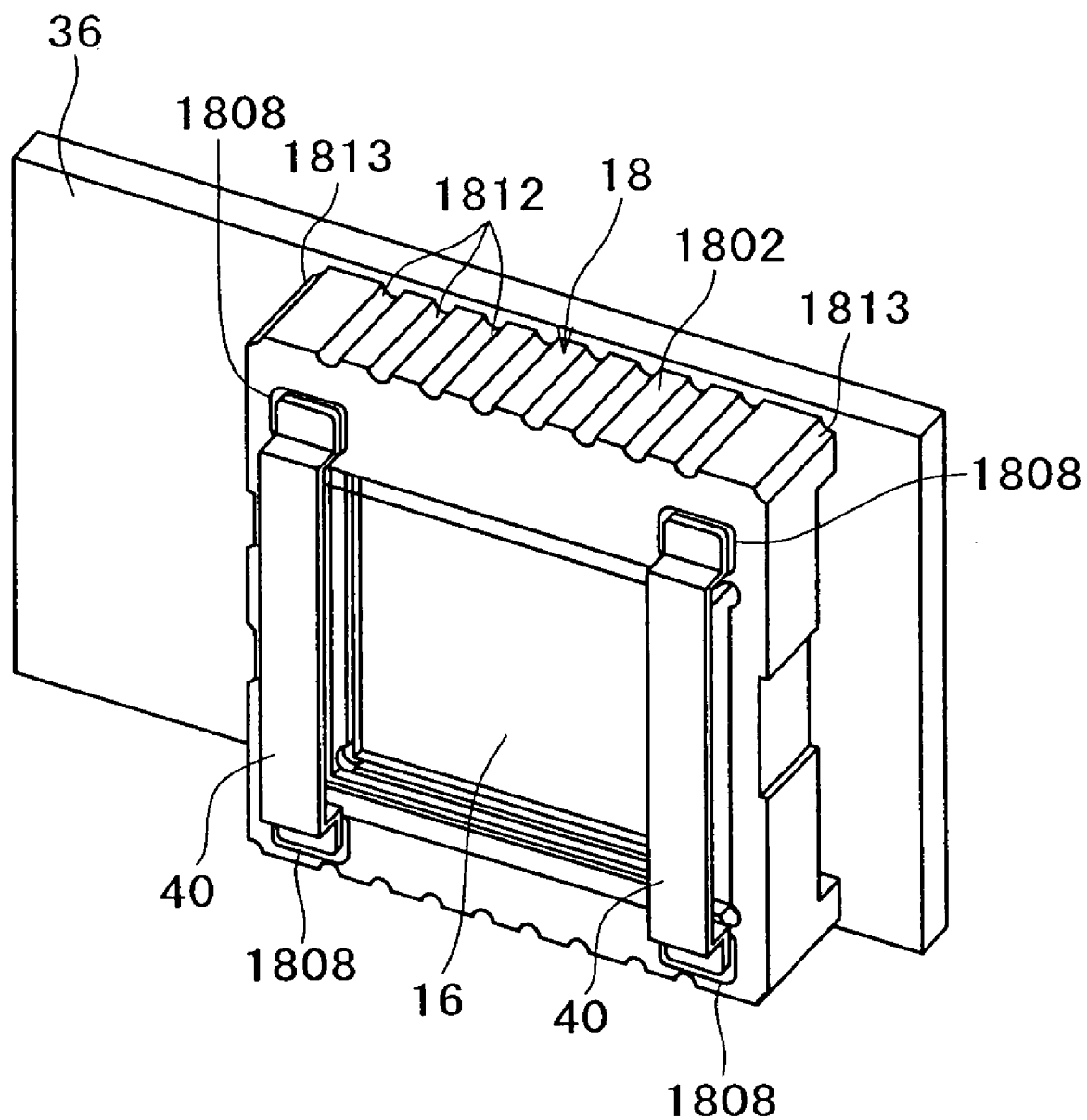
FIG. 22 is an assembly drawing of the rear unit of the fourth embodiment.
Figure 23:
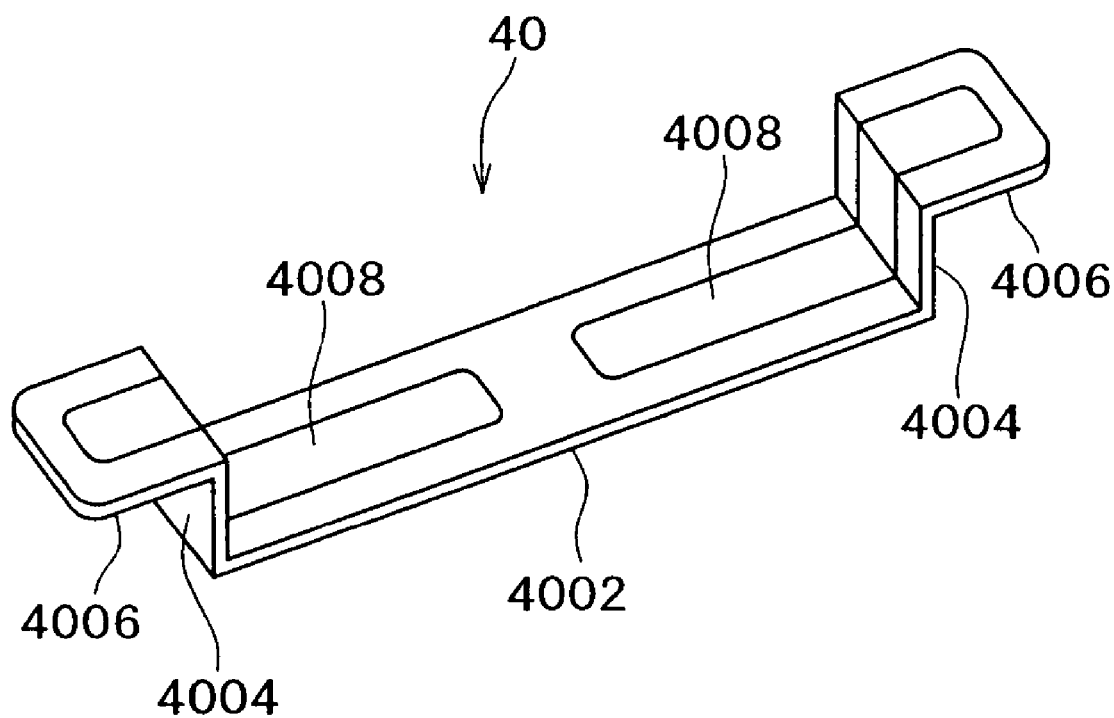
FIG. 23 is a perspective view of conducting member 40 of the fourth embodiment.

FIG. 21 is an exploded view in perspective of the rear unit in the fourth embodiment; FIG. 22 is an assembly drawing of the rear unit; and FIG. 23 is a perspective view of conducting member 40.

As shown in FIG. 21, the package 1802 of the image pickup device 18 has a frame portion 1814 in a rectangular frame shape surrounding a sensor portion 1804, while the frame portion 1814 has a front face 1803 in a frame shape facing the liquid crystal light controlling device 16 and having a larger contour than the liquid crystal light controlling device 16.

Input terminals 1612 of the liquid crystal light controlling device 16 are disposed at circumferential positions of the front face 1614 of the liquid crystal light controlling device 16.

Output terminals 1808 of the image pickup device 18 are disposed at circumferential positions of the front face 1803 of the package 1802 corresponding to the input terminals 1612, such that the output terminals 1808 are positioned outside the contour of the liquid crystal light controlling device 16.

As shown in FIG. 23, the conducting member 40 is formed, for example, of a linearly extended flexible substrate. The conducting member 40 has an intermediate portion 4002 that is extended linearly, two bent portions 4004 bent from both ends of the intermediate portion 4002 in one of the directions of the thickness of the intermediate portion 4002, and connection portions 4006 outwardly bent from the ends of the bent portions 4004 in the extended directions of the intermediate portion 4002, parallel to the intermediate portion 4002.

The size of the intermediate portion 4002 in its extended direction is made to be substantially equal to the size of the liquid crystal light controlling device 16 in the direction of its short side, while the size of the bent portion 4004 in its elongated direction is made to be substantially equal to the size of the liquid crystal light controlling device 16 in the direction of its thickness.

On the rear face, i.e., on the face in one of the directions of thickness of the intermediate portion 4002 and two connection portions 4006, there are formed two conductive films 4008, separated from each other at the middle portion of the intermediate portion 4002, extending from positions on the intermediate portion 4002 toward both ends, through the bent portions 4004, to the connection portions 4006.

Rear unit 22 is assembled as follows.

First, rear face 1616 of the liquid crystal light controlling device 16 is aligned with the front face 1803 of the image pickup device 18 such that the output terminals 1808 face the outer side of the liquid crystal light controlling device 16.

Then, each of the conducting members 40 is placed at a position toward the short side of the liquid crystal light controlling device 16 and the rear face including conductive film 4008 on the intermediate portion 4002 is attached to the input terminals 1612 of the liquid crystal light controlling device 16 with an anisotropic adhesive agent and, at the same time, the rear face including the conductive film 4008 on each connection portion 4006 is attached to each of the output terminals 1808 of the image pickup device 18 with the anisotropic adhesive agent. Thereby, the liquid crystal light controlling device 16 is fixed to the image pickup device 18.

Incidentally, the above-mentioned anisotropic adhesive is one that has conductivity in the direction of distance between conductive layer 4008 and the input terminals 1612 and the output terminals 1808, and has no conductivity in the direction perpendicular to the direction of distance.

By virtue of such a configuration, the input terminals 1612 and the output terminals 1808 are electrically connected by the adhesive and the conducting member 40, and the driving voltage from the output terminals 1808 is supplied to the input terminals 1612 through the anisotropic adhesive and the conducting member 40.

According to the fourth embodiment, the need for securing space around package 1802 of the image pickup device 18, especially at the sides of the package 1802, for the sake of connecting the input terminals 1612 with the output terminals 1808, can be eliminated as with the first embodiment, and this provides an advantage in miniaturizing the apparatus.

Further, since the holding member 32 and the presser member 34 as used in the first embodiment can be eliminated, the number of components for supplying the driving voltage can further be reduced, and hence a great advantage can be obtained in simplifying the configuration and reducing the cost.

Although four input terminals 1612 and four output terminals 1808 are connected by two conducting members 40 in the fourth embodiment, such a method also may be used in which totally four conducting members 40 are used and a pair of an input terminal 1612' and an output terminal 1808 are connected by one each of the conducting members 40.

Any material having conductivity may be used as the conducting member 40. Known wiring material having conductivity, or a metallic plate such as a copper plate having conductivity, for example, may be used as the conducting member 40.

Although an anisotropic conductive adhesive agent has been used as an adhesive agent having conductivity in the second embodiment and the fourth embodiment, it is also possible to use an isotropic conductive adhesive agent whose conductivity does not vary with direction, provided that, when such a conductive adhesive is used, the adhesive is applied so as not to cause a short circuit between a plurality of input terminals 1612 and between a plurality of output terminals 1808.

In each of the above-described embodiments, cases where a liquid crystal light controlling device is used as the light controlling device have been mentioned. However, the light controlling device is not limited to that. For example, a device capable of changing the transmitted light quantity such as an organic EL (electronic luminescent) device may be used.

Although the input terminal of the light controlling device has been connected with the output terminal for supplying the driving voltage with a conductive adhesive agent, the input terminal and the output terminal may be connected together by soldering.

Further, although a digital still camera has been taken as an example of the image pickup apparatus in the above described embodiments, the present invention can be applied to various electronic apparatuses, such as image pickup apparatuses for video cameras and television cameras, as well as mobile telephones having a lens barrel.

The foregoing invention has been described in terms of preferred embodiments. However, those skilled in the art will recognize that many variations of such embodiments exist. Such variations are intended to be within the scope of the present invention and the appended claims.

What is claimed is:

1. An image pickup apparatus comprising:

an image pickup device having a sensor portion for picking up an image of a subject and a package for holding the sensor portion, the package having a cavity formed therein and a flat package surface surrounding the cavity to define an opening thereinto, the cavity sized to receive the sensor portion in a manner that the package surrounds the sensor portion the flat package surface extending outwardly from the opening to define a flat package surface width;

a flat output terminal configured in a generally rectangular shape to define a flat output terminal width and a flat output terminal length being greater than the flat output terminal width, the flat output terminal disposed on the flat package surface such that the flat output terminal width extends substantially across the flat package surface width;

a light controlling device disposed in front of the image pickup device, transmittance thereof of light led to the image pickup device being adjusted by a driving voltage applied thereto, the light controlling device provided with a flat light controlling device surface; and a flat input terminal configured in a generally rectangular shape to define a flat input terminal width being at least approximately equal to the flat output terminal width and a flat input terminal length being at least approximately equal to the flat output terminal length, the flat input terminal disposed on the flat light controlling device surface to receive the driving voltage, wherein the output terminal for supplying the driving voltage to the input terminal facially opposes the input terminal, the output terminal and the flat package surface are disposed at least substantially in a first common plane, and the input terminal and the flat light controlling device surface are disposed at least substantially in a second common plane extending parallel to the first common plane.

2. The image pickup apparatus according to claim 1, wherein the package has a frame portion in a rectangular frame shape surrounding the sensor portion, the frame portion has a front face in a frame shape facing the light controlling device, and the output terminal is disposed on the front face.

3. The image pickup apparatus according to claim 1, wherein the package has a frame portion in a rectangular frame shape surrounding the sensor portion, the frame portion has a front face in a frame shape facing the light controlling device, the input terminal is constituted of a plurality of input terminals disposed separately from each other, and the output terminal is constituted of a plurality of output terminals disposed at positions corresponding to the input terminals of the front face.

4. The image pickup apparatus according to claim 1, wherein the light controlling device is formed in a plate shape and has a rear face facing the image pickup device, the package has a front face facing the light controlling device, the input terminal is disposed at a circumferential position of the rear face of the liquid crystal light controlling device, the output terminal is disposed at a circumferential position of the front face of the package, the light controlling device is held at its circumference by a holding member and fixed to a front face of the image pickup device, the holding member includes a first portion made of a conductive material and placed in contact with the input terminal, a second portion made of a conductive material and placed in contact with the output terminal, and a third portion made of a conductive material and connecting the first portion with the second portion, the first portion to the third portion together forming a conducting portion for supplying the driving voltage from the output terminal to the input terminal.

5. The image pickup apparatus according to claim 3, further comprising an optical system for introducing an image of the subject into the image pickup device, wherein the positions on the front face of the package where the output terminals are disposed are portions corresponding to the input terminals, and the conducting portion is linearly extended in a direction parallel to an optical axis of the optical system.

6. The image pickup apparatus according to claim 1, wherein the light controlling device is formed in a plate shape and has a rear face facing the image pickup device, the package has a front face facing the light controlling device, the input terminal is disposed on the rear face of the light controlling device, the output terminal is disposed at a position corresponding to the input terminal of the front face of the package, the light controlling device is fixed to the image pickup device by having the input terminal attached to the output terminal with a conductive adhesive agent, and the driving voltage is supplied from the output terminal to the input terminal through the adhesive agent.

7. The image pickup apparatus according to claim 1, wherein the light controlling device is formed in a plate shape and has a rear face facing the image pickup device, the package has a front face facing the light controlling device, the input terminal is disposed on the rear face of the light controlling device, the output terminal is disposed at a position corresponding to the input terminal of the front face of the package, the image pickup device and the light controlling device are fixed together with a conductive member interposed between a position on a front face of the image pickup device including the input terminal and a position on the rear face of the light controlling device including the output terminal, and the driving voltage is supplied from the output terminal to the input terminal through the conductive member.

8. The image pickup apparatus according to claim 1, wherein the package has a frame portion in a rectangular frame shape surrounding the sensor portion, the frame portion faces the light controlling device and has a front face in a frame shape larger in contour than the light controlling device, the light controlling device is in a plate shape and has a front face facing the subject and a rear face facing the image pickup device, the input terminal is disposed on the front face of the light controlling device, the output terminal is disposed at a position corresponding to the input terminal of the front face of the package so as to be positioned on the outside of a contour of the light controlling device, the rear face of the light controlling device is registered with a front face of the image pickup device such that the output terminal faces the outside of the light controlling device, there is provided a conducting member attached to each of the input terminal and the output terminal, and the driving voltage is supplied from the output terminal to the input terminal through the conducting member.

9. The image pickup apparatus according to claim 1, wherein, when the output terminal and the input terminal facially oppose each other, the flat input terminal width and the flat output terminal width concurrently extend in a widthwise direction and the flat input terminal length and the flat output terminal length concurrently extend in a lengthwise direction.

* * * * *